United States Patent
Matyjaszewski et al.

(10) Patent No.: US 8,367,051 B2
(45) Date of Patent: Feb. 5, 2013

(54) PREPARATION OF FUNCTIONAL GEL PARTICLES WITH A DUAL CROSSLINK NETWORK

(75) Inventors: Krzysztof Matyjaszewski, Pittsburgh, PA (US); Ke Min, Albany, CA (US); Jung Kwon Oh, Midland, MI (US); James Spanswick, Wheaton, IL (US); Nicolay V. Tsarevsky, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 637 days.

(21) Appl. No.: 12/311,673

(22) PCT Filed: Oct. 9, 2007

(86) PCT No.: PCT/US2007/021684
§ 371 (c)(1),
(2), (4) Date: Feb. 4, 2010

(87) PCT Pub. No.: WO2008/057163
PCT Pub. Date: May 15, 2008

(65) Prior Publication Data
US 2010/0143286 A1  Jun. 10, 2010

Related U.S. Application Data

(60) Provisional application No. 60/850,453, filed on Oct. 9, 2006, provisional application No. 60/878,594, filed on Jan. 4, 2007.

(51) Int. Cl.
*A61K 9/14* (2006.01)
*A61K 31/74* (2006.01)
(52) U.S. Cl. ..................... 424/78.31; 424/489
(58) Field of Classification Search ........................ None
See application file for complete search history.

(56) References Cited

U.S. PATENT DOCUMENTS

| | | | |
|---|---|---|---|
| 3,037,004 A | 5/1962 | Simone et al. |
| 3,096,312 A | 7/1963 | Henry |
| 3,183,217 A | 5/1965 | Serniuk et al. |
| 3,350,374 A | 10/1967 | Fetscher et al. |
| 3,397,186 A | 8/1968 | Edward et al. |
| 3,862,978 A | 1/1975 | Decker et al. |
| 3,959,225 A | 5/1976 | Kuntz |
| 3,963,491 A | 6/1976 | Marsh |
| 4,007,165 A | 2/1977 | MacLeay et al. |
| 4,073,870 A | 2/1978 | Saji et al. |
| 4,145,586 A | 3/1979 | Haag et al. |
| 4,374,751 A | 2/1983 | Dudgeon |
| 4,384,093 A | 5/1983 | Culbertson et al. |
| 4,581,429 A | 4/1986 | Solomon et al. |
| 4,728,706 A | 3/1988 | Farnham et al. |
| 4,806,605 A | 2/1989 | Hertler |
| 4,940,648 A | 7/1990 | Geiger |
| 4,940,760 A | 7/1990 | Boettcher et al. |
| 4,954,416 A | 9/1990 | Wright et al. |
| 4,978,498 A | 12/1990 | Yoshihiro et al. |
| 5,026,813 A | 6/1991 | Meder |
| 5,089,135 A | 2/1992 | Yoneyama et al. |
| 5,102,967 A | 4/1992 | Meder |
| 5,169,914 A | 12/1992 | Kaszas et al. |
| 5,210,109 A | 5/1993 | Tateosian et al. |
| 5,212,043 A | 5/1993 | Yamamoto et al. |
| 5,248,746 A | 9/1993 | Shimokawa et al. |
| 5,254,651 A | 10/1993 | Alexanian et al. |
| 5,281,681 A | 1/1994 | Austin |
| 5,294,678 A | 3/1994 | Tse et al. |
| 5,312,871 A | 5/1994 | Mardare et al. |
| 5,322,912 A | 6/1994 | Georges et al. |
| 5,324,879 A | 6/1994 | Hawthorne |
| 5,331,088 A | 7/1994 | Meister et al. |
| 5,401,804 A | 3/1995 | Georges et al. |
| 5,405,913 A | 4/1995 | Harwood et al. |
| 5,451,647 A | 9/1995 | Faust et al. |
| 5,470,928 A | 11/1995 | Harwood et al. |
| 5,506,312 A | 4/1996 | Arjunan |
| 5,508,353 A | 4/1996 | Liu et al. |
| 5,510,212 A | 4/1996 | Delnick et al. |
| 5,510,307 A | 4/1996 | Narayanan et al. |
| 5,543,158 A * | 8/1996 | Gref et al. .................... 424/501 |
| 5,558,954 A | 9/1996 | Morrison |

(Continued)

FOREIGN PATENT DOCUMENTS

| | | |
|---|---|---|
| CA | 2209061 | 2/1998 |
| CN | 1165828 A | 11/1997 |

(Continued)

OTHER PUBLICATIONS

H Gao, NV Tsarevsky, K Matyjaszewski. "Synthesis of Degradable Miktoarm Star Copolymers via Atom Transfer Radical Polymerization." Macromolecules, vol. 38, 2005, pp. 5995-6004. Published on Web Jun. 14, 2005.*

(Continued)

*Primary Examiner* — Frederick Krass
*Assistant Examiner* — Isaac Shomer
(74) *Attorney, Agent, or Firm* — K&L Gates LLP

(57) ABSTRACT

Functional gel particle formed from a crosslinked polymeric network including a fraction of stable crosslinks and a second fraction of cleavable crosslinks are disclosed. Functional compounds may be chemically or physically encapsulated within and/or released from the gel particle by selective cleavage of the cleavable crosslinks. The functional compounds may be delivered and released to a pre-selected target site. Peripheral or other accessible functionality on the surface of the gel particle allows attachment of a surface reactive agent, thereby modifying one or more surface properties of the gel particle. Processes of preparing the gel particles and processes of delivering the functional compounds to a target site are also disclosed.

29 Claims, 10 Drawing Sheets

U.S. PATENT DOCUMENTS

| | | | |
|---|---|---|---|
| 5,610,250 A | 3/1997 | Veregin et al. | |
| 5,656,708 A | 8/1997 | Meister | |
| 5,668,188 A | 9/1997 | Whinnery et al. | |
| 5,700,844 A | 12/1997 | Liao et al. | |
| 5,705,577 A | 1/1998 | Rossi et al. | |
| 5,708,102 A | 1/1998 | Fryd et al. | |
| 5,763,548 A | 6/1998 | Matyjaszewski et al. | |
| 5,767,210 A | 6/1998 | Lecomte et al. | |
| 5,773,538 A | 6/1998 | Feiring | |
| 5,789,487 A | 8/1998 | Matyjaszewski et al. | |
| 5,807,937 A | 9/1998 | Matyjaszewski et al. | |
| 5,811,500 A | 9/1998 | Dubois et al. | |
| 5,833,320 A | 11/1998 | Kaneko et al. | |
| 5,854,364 A | 12/1998 | Senninger et al. | |
| 5,886,118 A | 3/1999 | Percec | |
| 5,891,971 A | 4/1999 | Keoshkerian et al. | |
| 5,910,549 A | 6/1999 | Matyjaszewski et al. | |
| 5,945,491 A | 8/1999 | Matyjaszewski et al. | |
| 5,998,537 A | 12/1999 | Good et al. | |
| 6,054,507 A | 4/2000 | Funaki et al. | |
| 6,057,042 A | 5/2000 | Shimotsu | |
| 6,083,524 A | 7/2000 | Sawhney et al. | |
| 6,111,022 A | 8/2000 | Matyjaszewski et al. | |
| 6,114,448 A | 9/2000 | Derbes | |
| 6,114,482 A | 9/2000 | Senniger et al. | |
| 6,121,371 A | 9/2000 | Matyjaszewski et al. | |
| 6,124,411 A | 9/2000 | Matyjaszewski et al. | |
| 6,126,919 A | 10/2000 | Stefely et al. | |
| 6,143,848 A | 11/2000 | Lee et al. | |
| 6,162,882 A | 12/2000 | Matyjaszewski et al. | |
| 6,191,197 B1 | 2/2001 | Wang et al. | |
| 6,254,854 B1 | 7/2001 | Edwards et al. | |
| 6,255,448 B1 | 7/2001 | Grimaldi et al. | |
| 6,288,186 B1 | 9/2001 | Matyjaszewski et al. | |
| 6,310,149 B1 | 10/2001 | Haddleton | |
| 6,326,455 B2 | 12/2001 | Vassiliou et al. | |
| 6,407,187 B1 | 6/2002 | Matyjaszewski et al. | |
| 6,512,060 B1 | 1/2003 | Matyjaszewski et al. | |
| 6,534,610 B1 | 3/2003 | Wilson et al. | |
| 6,538,091 B1 | 3/2003 | Matyjaszewski et al. | |
| 6,541,580 B1 | 4/2003 | Matyjaszewski et al. | |
| 6,545,095 B1* | 4/2003 | Solomon et al. | 525/192 |
| 6,565,763 B1 | 5/2003 | Asakawa et al. | |
| 6,592,991 B1 | 7/2003 | Wiesner et al. | |
| 6,598,721 B2 | 7/2003 | Schmidl | |
| 6,624,262 B2 | 9/2003 | Matyjaszewski et al. | |
| 6,624,263 B2 | 9/2003 | Matyjaszewski et al. | |
| 6,627,314 B2 | 9/2003 | Matyjaszewski et al. | |
| 6,670,299 B1 | 12/2003 | Marks et al. | |
| 6,672,717 B2 | 1/2004 | Smith | |
| 6,686,432 B2 | 2/2004 | Coca et al. | |
| 6,692,914 B1 | 2/2004 | Klaerner et al. | |
| 6,737,488 B2 | 5/2004 | Vanhoorne et al. | |
| 6,759,491 B2 | 7/2004 | Matyjaszewski et al. | |
| 6,784,247 B2 | 8/2004 | Rechenberg et al. | |
| 6,784,248 B2 | 8/2004 | Coca et al. | |
| 6,790,919 B2 | 9/2004 | Matyjaszewski et al. | |
| 6,828,025 B2 | 12/2004 | Mukkaram et al. | |
| 6,887,962 B2 | 5/2005 | Matyjaszewski et al. | |
| 7,018,655 B2 | 3/2006 | Lele et al. | |
| 7,019,082 B2 | 3/2006 | Matyjaszewski et al. | |
| 7,037,992 B2 | 5/2006 | Wilson et al. | |
| 7,049,373 B2 | 5/2006 | Matyjaszewski et al. | |
| 7,056,455 B2 | 6/2006 | Matyjaszewski et al. | |
| 7,064,151 B1 | 6/2006 | Berge et al. | |
| 7,064,166 B2 | 6/2006 | Matyjaszewski et al. | |
| 7,105,579 B2 | 9/2006 | Adam et al. | |
| 7,125,938 B2 | 10/2006 | Matyjaszewski et al. | |
| 7,157,530 B2 | 1/2007 | Matyjaszewski et al. | |
| 7,332,550 B2 | 2/2008 | Matyjaszewski et al. | |
| 7,572,874 B2 | 8/2009 | Matyjaszewski et al. | |
| 7,678,869 B2 | 3/2010 | Matyjaszewski et al. | |
| 7,795,355 B2 | 9/2010 | Matyjaszewski et al. | |
| 2002/0169290 A1* | 11/2002 | Bornaes et al. | 530/351 |
| 2003/0236361 A1 | 12/2003 | Wilson et al. | |
| 2004/0044152 A1 | 3/2004 | Matyjaszewski et al. | |
| 2004/0171779 A1 | 9/2004 | Matyjaszewski et al. | |
| 2004/0204556 A1 | 10/2004 | Matyjaszewski et al. | |
| 2005/0090632 A1 | 4/2005 | Matyjaszewski et al. | |
| 2006/0258826 A1 | 11/2006 | Matyjaszewski et al. | |
| 2007/0106012 A1 | 5/2007 | Matyjaszewski et al. | |
| 2007/0155926 A1 | 7/2007 | Matyjaszewski et al. | |
| 2007/0244265 A1 | 10/2007 | Matyjaszewski et al. | |
| 2007/0276101 A1 | 11/2007 | Matyjaszewski et al. | |
| 2009/0171024 A1 | 7/2009 | Jakubowski et al. | |
| 2009/0312505 A1 | 12/2009 | Matyjaszewski et al. | |

FOREIGN PATENT DOCUMENTS

| | | |
|---|---|---|
| EP | 0265091 A1 | 4/1988 |
| EP | 0341012 A2 | 11/1989 |
| EP | 0434438 A | 6/1991 |
| EP | 0457916 A | 11/1991 |
| EP | 0789036 A1 | 8/1997 |
| EP | 0816385 A1 | 1/1998 |
| EP | 0824110 A1 | 2/1998 |
| EP | 0824111 A1 | 2/1998 |
| EP | 0826698 A1 | 3/1998 |
| EP | 0832902 A2 | 4/1998 |
| EP | 0870809 A2 | 10/1998 |
| EP | 0872493 A | 10/1998 |
| EP | 0879832 A1 | 11/1998 |
| EP | 1386935 A | 2/2004 |
| EP | 1469020 A | 10/2004 |
| EP | 1555273 A1 | 7/2005 |
| JP | 6322171 A | 11/1994 |
| WO | WO 88/00603 A3 | 1/1988 |
| WO | WO 94/13706 A | 6/1994 |
| WO | WO 97/18247 | 5/1997 |
| WO | WO 97/47661 A | 12/1997 |
| WO | WO 98/01480 | 1/1998 |
| WO | WO 98/06758 A1 | 2/1998 |
| WO | WO 98/20050 A2 | 5/1998 |
| WO | WO 99/28352 A | 6/1999 |
| WO | WO 00/47634 A1 | 8/2000 |
| WO | WO 00/56795 A1 | 9/2000 |
| WO | WO 00/75198 | 12/2000 |
| WO | WO 01/77197 A3 | 10/2001 |
| WO | WO 03/097107 A | 11/2003 |
| WO | WO 2004/041972 A | 5/2004 |
| WO | WO 2004/060928 A | 7/2004 |
| WO | WO 2004/087777 A2 | 10/2004 |
| WO | WO 2005/056621 A1 | 6/2005 |
| WO | WO 2007/025086 A2 | 3/2007 |
| WO | WO 2007/025310 A1 | 3/2007 |
| WO | WO 2007/059350 A2 | 5/2007 |
| WO | WO 2008/057163 A2 | 5/2008 |
| WO | WO 2008/148000 A1 | 12/2008 |
| WO | WO 2009/023353 A9 | 2/2009 |
| WO | WO 2009/111725 A1 | 9/2009 |

OTHER PUBLICATIONS

D Bontempo, KL Heredia, BA Fish, HD Maynard. "Cysteine-Reactive Polymers Synthesized by Atom Transfer Radical Polymerization for Conjugation to Proteins." Journal of the American Chemical Society, vol. 126, 2004, pp. 15372-15373.*

NV Tsarevsky, K Matyjaszewski. "Combining Atom Transfer Radical Polymerization and Disulfide/Thiol Redox Chemistry: A Route to Well-Defined (Bio)degradable Polymeric Materials." Macromolecules, vol. 38, 2005, pp. 3087-3092. Published on Web Mar. 24, 2005.*

Acar, et al., Macromolecules 2000, 33, 7700-7706.

Anderegg, et al., Helv. Chim. Acta 1977, 60, 123.

Annenkov et al., Poly-C-vinyltetrazoles: A New Type of Polyacid, Journal of Polymer Science Part A: Polymer Chemistry, 1993, pp. 1903-1906, vol. 31(7).

Ashford, et al., "First example of the atom transfer radical polymerisation of an acidic monomer: direct synthesis of methacrylic acid copolymers in aqueius media", Chemical Communications—Chemcom, Royal Society of Chemistry, GB (1999), pp. 1285-1286.

Asscher et al., Chlorine-Activation by Redox-Transfer, Part IV, The Addition of Sulphonyl Chlorides to Vinylic Monomers and Other Olefins, Journal of the Chemical Society, 1964, pp. 4962-4971.

Bamford, Comprehensive Polymer Science (First Supplement), eds., Pergamon: Oxford vol. 3., p. 123 (1991).

Baumann, et al., Macromolecular Materials and Engineering (2000), 280/281, 1-6.
Bellus, Pure & Appl. Chem. 57, 1827 (1985).
Bledzki, et al., Makromol. Chem. 184, 745 (1983).
Braunecker, et al., Macromolecules 2005, 38, 4081.
Braunecker, et al., Organometal Chem. 2005, 690, 916.
Brittain et al., Makromol. Chem., Macromol. Symp. 67, pp. 373-386 (1993), "Termination Processes in Group Transfer Polymerization".
Buback, et al. (1995) Macromol. Chem. Phys. 196, 3267-80.
Buback, et al. (2002) Macromol. Chem. Phys. 203, 2570-2582.
Bywater, Makromol. Chem., Macromol. Symp. 67, pp. 339-350 (1993), "Group Transfer Polymerization—A Critical Overview".
Carnahan et al., Synthesis and Characterization of Poly(glycerol-succinic acid) Dendrimers, Macromolecules, 2001, pp. 7648-7655, vol. 34(22).
Carter et al., Polyimide Nanofoams From Phase-Separated Block Copolymers, Electrochemical Society Proceedings, 1997, pp. 32-43, vol. 97(8), Electrochemical Society, Pennington, NJ, US.
Caruso, Nanoengineering of Particle Surfaces—Adv. Mater. 2001, 13, No. 1, Jan. 5, 11-22—Wiley—VCH Verlag GmbH.D-69469 Weinheim, 2001.
Catala, et al., Macromolecules, 1995, 28, 8441.
Chemical Abstracts, vol. 85, 1976, pp. 20.
Chen et al., Pryolytic Behavior and In-Situ Paramagnetism of Star-like C60(CH3)x(PAN)xcopolymers, European Polymer Journal, 1998, pp. 421-429, vol. 34(3-4), Elsevier Science Ltd., Oxford, GB.
Coca et al., Polymerization of Acrylates by Atom Transfer Radical Polymerization. Homopolymerization of 2-Hydroxyethyl Acrylate, Journal of Polymer Science, Part A: Polymer Chemistry, 1998, pp. 1417-1424, vol. 36.
Cohen, et al., Inorg. Chem. 13, 2434 (1974).
Collman et al., "Clicking" Functionality onto Electrode Surfaces, Langmuir, 2004, pp. 1051-1053, vol. 20.
Curran, et al., Comprehensive Organic Synthesis, eds., Pergamon: Oxford vol. 4, p. 715 (1991).
Curran, et al., J. Am. Chem. Soc. 116, 4279 (1994).
Curran, et al., J. Org. Chem., 54, 3140 (1989).
Curran, Synthesis, 489 (1988).
Darkow et al., "Synthesis, Photomodification and Characterization of Homo- and Copolymers with 2,5-bisaryltetrazolyl Pendant Groups", Reactive and Functional Polymers, 1997, pp. 195-207, vol. 32(2).
Davies, "Reactions of L-ascorbic acid with transition metal complexes," Polyhedron, 1992, 11, 285-321.
De Vries, et al., "The Effect of Reducing Monosaccharides on the Atom Transfer Radical Polymerization of Butyl Methacrylate," Macromol. Chem. Phys., 2001, 202, 1645-1648.
Demko et al., A Click Chemistry Approach to Tetrazoles by Huisgen 1,3-Dipolar Cycloaddition: Synthesis of 5-Acyltetrazoles from Azides and Acyl Cyanides, Angewandte Chemie, International Edition, 2004, pp. 2113-2116, vol. 41(12).
Desmarquest, et al., Electrochim. Acta (1968), 13, 1109-1113.
Dreezen, et al., "Nano-Structured Polymer Blends: Phase Structure, Crystallisation Behaviour and Semi-Crystalline Morphology of Phase Separated Binary Blends of Poly(ethyleneoxide) and Poly(ether sulphone)", Polymer, Elsevier Science Publishers B.V., GB, vol. 41, No. 4, Feb. 2000, pp. 1395-1407.
Druliner, Macromolecules, 24, 6079 (1991).
Endo, et al., Macromolecules, 25, 5554 (1992).
Feng, "Synthesis and Free Radical Polymerization of 2-oxo-3-methylene-5-phenyl-1,4-dioxan". Chinese Journal of Polymer Science, 1993, 11, 2, pp. 153-157.
Fischer, et al., Acc. Chem. Res. 20, 200-206 (1987).
Fischer, H., Chem. Rev. 2001, 101, 3581-3610.
Frackowiak, et al., "Supercapacitor electrodes from multiwalled carbon nanotubes", Applied Physics Letters, 77, pp. 2421-2423 (2000).
Fukuda, et al, Chem. Letters, 1996, 4, 293.
Fukuda, et al., Macromolecules, 1996, 29, 3050.
Gabaston, et al., "Synthesis of water soluble homopolymers and block copolymers by living free-radical polymerization", Polymr Preprints (American Chemical Society, Division of Polymer Chemistry), 38(1), pp. 719-720 (1997).
Gaynor, et al., Polym. Prep. (Am. Chem. Soc. Polym. Chem. Div.), 36(1), 467 (1995).

Georges, et al., Macromolecules 1993, 26, 2987.
Georges, et al., Macromolecules 1994, 27, 7228.
Georges, et al., Macromolecules 1993, 26, 5316.
Gilbert & Williams, Reactivity Ratios of Conjugated Dienes Copolymerized in Emulsion at 5°, J. Am. Chem. Soc. 74, (1952), pp. 4114-4118.
Gnanou et al., "Effect of Phenol and Derivatives on Atom Transfer Radical Polymerization in the Presence of Air," Journal Polymer Science, Part A: Polymer Chemistry, 2004, 42, 351-359.
Granel et al., Controlled Radical Polymerization of Methacrylic Monomers in the Presence of Bis(ortho-chelated) Arylnickel (II) Complex and Different Activated Alkyl Halides, Macromolecules, 1996, pp. 8576-8582, vol. 29(27).
Grayson et al., Convergent Dendrons and Dendrimers: From Synthesis to Applications, Chemical Reviews, 2001, pp. 3819-3867, vol. 101(12).
Greszta et al., Gradient Copolymers of Styrene and Acrylonitrille Via Atom Transfer Radical Polymerization, Polymer Preprints, 1997, pp. 709-710, vol. 38(1).
Greszta, et al., Macromolecules, 27, 638 (1994).
Gromada et al., Simultaneous Reverse and Normal Initiation in Atom Transfer Radical Polymerization, Macromolecules, 2001, pp. 7664-7671, 34(22).
Haddleton, et al., "Copper-mediated living radical polymerization utilizing biological and end group modified poly(ethylene-co-butylene) macroinitiators", ACS Symposium Series, 768, (Controlled/Living Radical Polymerization), pp. 182-196 (2000).
Hawker, "Molecular Weight Control by a Living Free Radical Polymerization Process", Journal American Chem. Society, 1994, vol. 116, pp. 11185-11186.
Hawker, et al., Macromolecules, 1996, 29, 2686.
Hayes, et al., J. Am. Chem. Soc. 110, 5533 (1988).
Hedrick et al., Dendrimer-like Star Block and Amphiphlic Copolymers by Combination of Ring Opening and Atom Transfer Radicat Polymerization. Macromolecules, 1998, 31, 8671-8705.
Helms et al., Dendronized Linear Polymers via "Click Chemistry", Journal of the American Chemical Society, 2004, pp. 15020-15021, vol. 126(46).
Heuts et al., "Atom transfer radical polymerization in the presence of a thiol: more evidence supporting radical intermediates," Macromol. Chem. Phys., 1999, 200, 1380-1385.
Hirao, et al., J. Synth. Org. Chem. (Japan), 52(3), 197 (1994).
Hirao, et al., Syn. Lett. 217 (1990).
Hong, et al., "Synthesis of water-soluble fluorine-containing block copolymers by atom transfer radical polymerization", 25(4), 302 (2001).
Hovestad, et al., Macromolecules 2000, 33, 4048-4052.
Ihre et al., Fast and Convenient Divergent Synthesis of Aliphatic Ester Dendrimers by Anhydride Coupling, Journal of the American Chemical Society, 2001, pp. 5908-5917, vol. 123(25).
Iqbal, et al., Chem. Rev. 94, 519 (1994).
Jakubowski et al., "Activators Regenerated by Electron Transfer for Atom Transfer Radical Polymerization of Styrene," Macromolecules, 2006, 39, 39-45.
J-F Lutz et al,. Synthesis and Properties of Copolymers with Tailored Sequence Distribution by Controlled/Living Radical Polymerization, in ACS Symposium Series, Advances in Controlled/living Radical Polymerizations, American Chemical Society Division of Polymer Chemistry, 2003, Chapter 19, pp. 268-282, vol. 854.
Jo et al., Effects of Various Copper Salts and Additives on Polymerization of Acrylonitrile by Atom Transfer Radical Polymerization, Polymer Preprints, 1997, pp. 699-700, vol. 38(1).
Jo et al., Polyacrylonitrile with Low Polydispersities by Atom Transfer Radical Polymerization, Polymer Preprints, 1997, pp. 697-698, vol. 38(1).
Kamigata, et al., Novel Perfluoroalkylation of Alkenes with Perfluoroalkanesulphonyl Chlorides Catalysed by a Ruthenium (II) Complex, Journal of the Chemical Society, Perkins Transactions 1, 1991, pp. 627-633.
Kato, et al., Macromolecules, 28, 1721 (1995).
Kawaguchi, et al., "Dispersion Polymerization", in Polymer Particles, Masayoshi Okubo, ed., Adv. Polym. Sci., 2005, 175, 299-328.

Kizhnyaev et al., Vinyltetrazoles: Synthesis and Properties, Russian Chemical Reviews, 2003, pp. 143-164, vol. 72(2).

Kolb et al., Click Chemistry: Diverse Chemical Function from a Few Good Reactions, Angewandte Chemie, International Edition, 2001, pp. 2004-2021, vol. 40(11).

Kosower, E.M., Acc Chem. Res. (1971), 4, 193-198.

Kowalewski et al., Advances in Nanostructured Carbons from Block Copolymers Prepared by Controlled Radical Polymerization Techniques, in Controlled Radical Polymerization: From Synthesis to Materials, American Chemical Society Division of Polymer Chemistry, 2005, Chapter 21, pp. 295-310, vol. 944.

Kwak et al., "ARGET ATRP of methyl methacrylate in the presence of nitrogen-based ligands as reducing agents," Polym. Int. 2009, 58, 242-247.

Lazzari, et al., Macromolecular Chemistry and Physics (2005), 206, 1382-1388.

Leduc et al., J. Am. Chem. Soc. 1996, 118, 11111-11118.

Lee, et al., "Synthesis of carboxylic acid functionalized nanoparticles by reversible addition-fragmentation chain transfer (RAFT) miniemulsion polymerization of styrene", Polymer, Elsevier Science Publishers B.V., GB, vol. 46, No. 11, pp. 3661-3668 (2005).

Lewis, et al., Copolymerization VII, Copolymerization of Some Further Monomer Pairs, Apr. 1948, pp. 1527-1529.

Li, et al., "Highly ordered carbon nanotube arrays for electronics applications", Applied Physics Letters, 75 pp. 367-369 (1999).

Li, et al., ASC Polym. Preprints, 1995, 36(1), 469.

Lingane, "Interpretation of the Polarographic Waves of Complex Metal Ions," Chem. Rev. 1941, 29, 1.

Liu et al., "Poly(N-isopropylacrylamide) hydrogels with improved shrinking kinetics by RAFT polymerization", Mar. 22, 2006, Polymer Elsevier Science Publishers, B.V., GB, pp. 2330-2336.

Majoral et al., Dendrimers Containing Heteroatoms (Si, P, B, Ge, or Bi), Chemical Reviews, 1999, pp. 845-880, vol. 99(3).

Makino et al., Controlled Atom Transfer Radical Polymerizations of Methyl Methacrylate Under Micellar Conditions, Polymer Preprints, 1988, pp. 288-289, vol. 39(1).

Mao, et al., "Controlled polymerizations of 2-(dialkylamino)ethyl methacrylates and their block copolymers in protic solvents at ambient temperature via ATRP", Journal of Polymer Science, Part A Polymer Chemistry, 42(20), pp. 5161-5169 (2004).

Maraval et al., "Lego" Chemistry for the Straightforward Synthesis of Dendrimer, Journal of Organic Chemistry, 2003, pp. 6043-6046, vol. 68(15).

Mardare, et al., ACS Polymer Preprints 35(1), 778 (1994).

Mardare, et al., Macromolecules, 27, 645 (1994).

Mardare, et al., Polym. Prep. (ACS), 36(1), 700-701 (1995).

Marestin et al., Nitroxide Mediated Living Radical Polymerization of Styrene in Emulsion, Macromolecules, 1998, pp. 4041-4044, vol. 31(12).

Matsumoto, et al., Synth. Commun. (1985) 15, 515.

Matthews et al., Dendrimers-Branching out from Curiosities into New Technologies, Progress in Polymer Science, 1998, pp. 1-56, vol. 23.

Matyjaszewski ed., Controlled/"Living" Radical Polymerization. Progress in ATRP, NMP, and RAFT, in: ACS Symposium Ser., 2000, Chapter 19, Reverse Atom Transfer Radical Polymerization Using AIBN or BPO as Initiator, pp. 263-275.

Matyjaszewski et al., (Structural Control of Poly(Methyl Methacrylate)-g-poly(Lactic Acid) Graft Copolymers by Atom Transfer Radical Polymerization (ATRP). Macromolecules 2001, 34, 6243-6248.

Matyjaszewski et al., "Controlled/'Living Radical Polymerization. Kinetics of the Homogeneous Atom Transfer Radical Polymerization of Styrene," J. Am. Chem. Soc., 1997, 119, 674-680.

Matyjaszewski et al., Atom Transfer Radical Polymerization, Chemical Reviews, 2001, pp. 2921-2990, vol. 101(9).

Matyjaszewski et al., Controlled/"Living" Radical Polymerization of Styrene and Methly Methacrylate Catalyzed by Iron Complexes1, Macromolecules, 1997, pp. 8161-8164, vol. 30(26).

Matyjaszewski et al., Controlled/Living Radical Polymerization: State of the Art in 2002, in ACS Symposium Series, Advances in Controlled/living Radical Polymerizations, American Chemical Society Division of Polymer Chemistry, 2003, Chapter 1, pp. 2-9, vol. 854.

Matyjaszewski et al., Controlled/Living Radical Polymerization: State of the Art in 2005, in Controlled Radical Polymerization: From Synthesis to Materials, American Chemical Society Division of Polymer Chemistry, 2005, Chapter 1, pp. 2-12, vol. 944.

Matyjaszewski et al., Zerovalent Metals in Controlled/"Living" Radical Polymerization, Macromolecules, 1997, pp. 7348-7350, vol. 30(23).

Matyjaszewski, "The Importance of Exchange Reactions in the Controlled/Living Radical Polymerization in the Presence of Alkoxyamines and Transition Metals", Macromolecule Symposium, 1996, vol. 111, pp. 47-61.

Matyjaszewski, "Radical Nature of Cu-Catalyzed Controlled Radical Polymerizations (Atom Transfer Radical Polymerization)," Macromolecules, 1998, 31, 4710-4717.

Matyjaszewski, Controlled Radical Polymerization, American Chemical Society Division of Polymer Chemistry, 1998, ACS Symposium Series, Ch. 1, pp. 2-30. vol. 685.

Matyjaszewski, et al., Macromolecules 34, 5125 (2001).

Matyjaszewski, et al., Tetrahedron (1997), 53, 15321-15329.

McCarthy et al., Grafting Chromatographic Stationary Phase Substrates by Atom Transfer Radical Polymerization, in Controlled Radical Polymerization: From Synthesis to Materials, American Chemical Society Division of Polymer Chemistry, 2005, Chapter 18, pp. 252-268, vol. 944.

Min, et al, "Atom Transfer Radical Dispersion Polymerization of Styrene in Ethanol", Macromolecules, ACS, Washington, DC, US, vol. 40, No. 20, (Oct. 2, 2007), pp. 7217-7221.

Mitani, et al., J. Am Chem. Soc. 105, 6719 (1983).

Nagashima, J. Org. Chem. 57, 1682 (1992).

Nagashima, J. Org. Chem. 58, 464 (1993).

Navon, et al., Inorg. Chem. 1999, 38, 3484.

Nishikawa et al., Evidence for Living Radical Polymerization of Methyl Methacrylate with Ruthenium Complex: Effects of Protic and Radical Compounds and Reinitiation from the Recovered Polymers, Macromolecules, 1997, pp. 2244-2248, vol. 30(8).

Odell, et al., Macromolecules, 1995, 28, 8453.

Odian, Principles of Polymerization, Third Edition, John Wiley & Sons, p. 205-233 (1991).

Orochov et al., Redox-Transfer, Part VI, Determination of Hammet's P-Constant for the Oxidation of Cuprous Chloride by Aromatic Sulphonyl Chlorides, Journal of the Chemical Society (B), (1969), pp. 255-259.

Orochov, et al., J. Chem. Soc., Perkin II, 1000 (1973).

Orr, Thermochemical Aspects of Butadiene-Styrene Copolymerization, 1960, pp. 74-82.

Otsu, et al., Chem. Express 5(10), 801 (1990).

Otsu, et al., Synthesis, Reactivity, and Role of-Vinylbenzyl N,N-Diethyldithiocarbamate as a Monomer-Iniferter in Radical Polymerization, Macromolecules, 1986, pp. 287-290, vol. 19(2).

Pakuka et al., Polymers, Particles, and Surfaces with Hairy Coatings: Synthesis, Structure, Dynamics, and Resulting Properties, in ACS Symposium Series, Advances in Controlled/living Radical Polymerizations, American Chemical Society Division of Polymer Chemistry, 2003, Chapter 26, pp. 366-382, vol. 854.

Paoletti, et al., Inorg. Chem. 1967, 6, 64.

Paoletti, et al., Inorg. Chim. Acta Rev. 1973, 7, 43.

Patten et al., Atom Transfer Radical Polymerization and the Synthesis of Polymeric Materials, Advanced Materials, 1998, pp. 901-915, vol. 10(12).

Patten et al., Polymers with very Low Polydispersities from Atom Transfer Radical Polymerization, 1996, Science, pp. 866-868, vol. 272.

Percec et al., "Living" Radical Polymerization of Styrene Initiated by Arenesulfonyl Chlorides and $Cu^1(bpy)_nCl$, Macromolecules, 1995, pp. 7970-7972, vol. 28(23).

Percec et al., Metal-Catalyzed "Living" Radical Polymerization of Styrene Initiated with Arenesulfonyl Chlorides. From Heterogeneous to Homogeneous Catalyses, Macromolecules, 1996, pp. 3665-3668, vol. 29(10).

Percec et al., Self-Regulated Phase Transfer of Cu$_2$O/bpy, Cu(0)/bpy, and Cu$_2$O(Cu(0)/bpy Catalyzed "Living" Radical Polymerization Initiated with Sulfonyl Chlorides, Macromolecules, 1998, pp. 4053-4056, vol. 31(12).
Pintauer et al., Toward Structural and Mechanistic Understanding of Transition Metal-Catalyzed Atom Transfer Radical Processes, in ACS Symposium Series, Advances in Controlled/living Radical Polymerizations, American Chemical Society Division of Polymer Chemistry, 2003, Chapter 10, pp. 130-147, vol. 854.
Punna et al., Click Chemistry in Polymer Synthesis, Polymer Preprints, 2004, pp. 778-779, vol. 45(1).
Puts, et al., Macromolecules, 1996, 29, 3323.
Qiu et al., Cyclic Voltammetric Studies of Copper Complexes Catalyzing Atom Transfer Radical Polymerization, Macromolecular Chemistry and Physics, 2000, pp. 1625-1631, vol. 201(14).
Queffelec et al., Optimization of Atom Transfer Radical Polymerization Using Cu(I)/Tris(2-(dimethylamino)ethyl)amine as a Catalyst, Macromolecules, 2000, pp. 8629-8639, vol. 33.
Quirk et al., Makromol. Chem., Macromol. Symp. 67, pp. 351-363 (1993), "Mechanistic Aspects of Group Transfer Polymerization".
Richard et al., Acrylate-Based Block Copolymers Prepared by Atom Transfer Radical Polymerization as Matrices for Drug Delivery Applications, in Controlled Radical Polymerization: From Synthesis to Materials, American Chemical Society Division of Polymer Chemistry, 2005, Chapter 17, pp. 234-251, vol. 944.
S.A.F. Bon et al., Controlled Radical Polymerization in Emulsion, Macromolecules, 1997, pp. 324-326, vol. 30(2).
Samuni et al., "On the cytotoxicity of vitamin C and metal ions," European Journal of Biochemistry, 1983, 137. 119-124.
Schubert et al., Design of Effective Systems for Controlled Radical Polymerization of Styrene: Application of 4,4'-Dimethyl and 5,5'-Dimethyl 2,2'-Bipyridine Copper(ii) Complexes, Macromolecular Rapid Communication, 1999, pp. 351-355, vol. 20.
Schulz & Milkovich, Relative Reactivities and Graft Distributions of Polystyrene Macromers in Vinyl Chloride Copolymerization, Polymer International, 1994, pp. 141-149, Great Britain.
Seijas, et al., Tetrahedron, 48(9), 1637 (1992).
Shen, et al., Supported Atom Transfer Radical Polymerization of Methyl Methacrylate Mediated by CuBr-Tetraethyldiethylenetriamine Grafted onto Silica Gel—Journal of Polymer Science: Part A: Polymer Chemistry, vol. 39, 1051-1059 (2001); John Wiley & Sons, Inc.
Srivastava, et al., J. Inorg. Nucl. Chem. (1980), 42, 47.
Stille et al., Synthesis and Copolymerization of Styryl-Substituted Tetrazoles. Thermal Cross-Linking of Copolymers Containing Dipolarophiles and the Tetrazoles as Nitrile Imine Dipole Precursors, Macromolecules, 1972, pp. 377-384, vol. 5(4).
Sumerlin et al., Click Functionalization of Well-Defined Copolymers Prepared by Atom Transfer Radical Polymerization, in Controlled Radical Polymerization: From Synthesis to Materials, American Chemical Society Division of Polymer Chemistry, 2005, Chapter 11, pp. 140-152, vol. 944.
Takeichi et al., Preparation of Porous Carbon Films by the Pyrolysis of Poly(Urethane-imide) Films and Their Pore Characteristics, Carbon, 2001, pp. 257-265, vol. 39(2).
Tang, et al., J. Am. Chem. Soc., 128, 1598-1604 (2006).
Tsarevesky et al., Factors Determining the Performance of Copper-Based Atom Transfer Radical Polymerization Catalysts and Criteria for Rational Catalyst Selection, in Controlled Radical Polymerization: From Synthesis to Materials, American Chemical Society Division of Polymer Chemistry, 2005, Chapter 5, pp. 56-70, vol. 944.
Tsarevsky et al., Well-Defined (Co)polymers with 5-Vinyltetrazole Units via Combination of Atom Transfer Radical (Co)polymerization of Acrylonitrile and "Click Chemistry"-Type Postpolymerization Modification, Macromolecules, 2004, pp. 9308-9313, vol. 37(25).
Udding, et al., J. Org. Chem. 59, 1993 (1994).
Van Gaal et al., "Trends in Redox Potentials of Transition Metal Complexes," Coord. Chem. Rev. 1982, 47, 41.
Veregin, et al., Macromolecules, 1996, 29, 4161.
Vidts, et al., "Design of water-soluble block copolymers containing poly(4-vinylpyridine) by atom transfer radical polymerization", European Polymer Journal, Pergamon Press Ltd, Oxford, GB, vol. 42, No. 1, pp. 43-50 (2006).
Vlcek, "Ligand Based Redox Series," Coord. Chem. Rev. 1982, 43, 39.
Von Werne, et al., Preparation of Structurally Well-Defined Polymer—Nanoparticle Hybrids with Controlled/living Radical Polymerizations—J. Am. Chem. Soc. 1999, 121, 7409-7410.
Wang et al., "Living"/Controlled Radical Polymerization, Transition-Metal-Catalyzed Atom Transfer Radical Polymerization in the Presence of a Conventional Radical Initiator, Macromolecules, 1995, pp. 7572-7573, vol. 28.
Wang et al., Controlled/"Living" Radical Polymerization. Atom Transfer Radical Polymerization in the Presence of Transition-Metal Complexes, Journal of the American Chemical Society, 1995, pp. 5614-5615, vol. 117(20).
Wang et al., Controlled/"Living" Radical Polymerization. Halogen Atom Transfer Radical Polymerization Promoted by a Cu(I)/Cu(II) Redox Process, Macromolecules, 1995, pp. 7901-7910, vol. 28(23).
Wang et al., ESR Study and Radical Observation in Transition Metal-Mediated Polymerization: Unified View of Atom Transfer Radical Polymerization Mechanism, in ACS Symposium Series, Advances in Controlled/living Radical Polymerizations, American Chemical Society Division of Polymer Chemistry, 2003, Chapter 12, pp. 161-179, vol. 854.
Wang, et al., "Facile Synthesis of Acidic Copolymers Via Atom Transfer Radical Polymerization in Aqueous Media at Ambient Temperature", Macromolecules, ACS, Washington, DC, vol. 33, No. 2, (Jan. 25, 2000), pp. 255-257.
Wang, et al., J. Am. Chem. Soc. (1992), 114, 248-255.
Wang, et al., Polym. Prep. (Am. Chem. Soc. Polym. Chem. Div.), 36(1), 465 (1995).
Wayland, et al., Am. Chem. Soc., 116, 7943 (1994).
Webster, Living Polymerization Methods, Science, 1991, pp. 887-893, vol. 25.
Webster, Makromol. Chem., Macromol. Symp. 67, pp. 365-371 (1993), "Mechanism of GTP: Can all of the Available Data be Accommodated?".
Wei et al., Atom Transfer Radical Polymerization of Styrene in the Presence of Iron Complexes, Polymer Preprints, 1997; pp. 231, vol. 38(2).
Wu et al., Efficiency and Fidelity in a Click-Chemistry Route to Triazole Dendrimers by the Copper(I)-Catalyzed Ligation of Azides and Alkynes, Angewandte Chemie, International Edition, 2004, pp. 3928-3932, vol. 43(30).
Xia et al., Controlled/"Living" Radical Polymerization. Homogenous Reverse Atom Transfer Radical Polymerization Using AIBN as the Initiator, Macromolecules, 1997, pp. 7692-7696, vol. 30.
Xia, et al., "Atom Transfer Radical Polymerization of 4-Vinylpyridine", Macromolecules, pp. 3531-3533 (1999).
Zeng, et al., "Synthesis and Characterization of Comb-Branched Polyelectrolytes. 1. Preparation of Cationic Macromonomer of 2-(Dimethylamino)ethyl Methacrylate by Atom Transfer Radical Polymerization", Macromolecules, 33(5), pp. 1628-1635 (2000).
U.S. Appl. No. 09/534,827, filed Mar. 23, 2000.
Gaynor et al., Macromolecules 1998, 31, 5951-5954.
Chambard et al., Macromol. Symp. 2000, 150, 45-51.
Li et al., Macromolecules 2004, 37, 2106-2112.
Min et al., J. Am. Chem. Soc. 2005, 127, 3825-3830.
Min et al., J. Polym. Sci., Part A: Polym. Chem. 2005, 43, 3616.
Antonietti et al., Macromolecules, 1991, 24: 6636-6643.
Feng et al., Gaofenzi Cailiao Kexue Yu Gongcheng; 2005, 21, 117-120.
Feng, et al., J. Appl. Polym. Sci., 2006, 99 1093.
Min et al., Macromolecules 2005, 38, 8131-8134.
Nicolas et al., Macromolecules 2005, 38, 9963-9973.
Ferguson et al., Macromolecules 2005, 38, 2191-2204.
Gilbert et al., Macromolecular Symposia 2006, 231, 84-93.
Chow et al., Adv. Polym. Sci. 2005, 175, 257-298.
Chow et al., Langmuir 1999, 15, 3202-3205.
El-Safty et al., Chem. Mater. 2005, 17, 3137-3145.
Stoffer et al., J. Polym. Sci. Polym. Chem. Ed. 1980, 18, 2641-2648.
Ferrick et al., Macromolecules 1989, 22, 1515-1517.
Kuo et al., Macromolecules 1987, 20, 1216-1221.
Jakubowski et al., Macromolecules 2005, 38, 4139-4146.
Antonietti et al., Macromol. Chem. Phys. 1995, 196, 441-466.

Guo et al., J. Polym. Sci., Part A: Polym. Chem. 1989, 27, 691-710.
Cramer, W. Proc. Chem. Soc. 1914, 30, 293.
Reiner et al., Baskerville Chemical Journal 1953, 4, 15-17.
Singh et al., Zeitschrift fuer Physikalische Chemie (Leipzig) 1957, 207, 198-204.
Parris et al., Discussions of the Faraday Society 1960, 240-247.
Weiss et al., Inorg. Chem. 1964, 3, 1344-1348.
Maeda et al., J. Adv. Polym. Sci. 2006, 193, 103.
Brown et al., Nature Rev. Cancer 2004, 4, 437.
Khelfallah et al., Macromolecular Rapid Communications 2006, 27, 1004-1008.
Huang et al., Biomarcomolecules 2005, 6, 2131-2139.
Houk et al., J. Am. Chem. Soc. 1987, 109, 6825.
Tsarevsky et al., Thesis CMU, 2005, Chapter 6.
Li et al., Angew Chem. Int. Ed. 2006, 45, 3510.
Li et al., Macromolecules 2006, 39, 2726.
Gao et al., Macromolecules 2005, 38, 5995.

Zelikin et al., Biomacromolecules 2006, 7, 27.
Schafer et al., Free Radical Biol. Med. 2001, 30, 1191.
Medicinal Research Reviews, 2002, 22, 225-250.
Tsarevsky et al., "Combining Atom Transfer Radical Polymerization and Disulfide/Thiol Redox Chemistry: A Route to Well-Defined (Bio)degradable Polymeric Materials", Macromolecules, 2005, 38, 3087-3092.
Oh et al., "Inverse Miniemulsion ATRP: A New Method for Synthesis and Functionalization of Well-Defined Water-Soluble/Cross-Linked Polymeric Particles", Journal of the American Chemical Society, 2006, 128, 5578-5584.
Oh et al., "Biodegradable Nanogels Prepared by Atom Transfer Radical Polymerization as Potential Drug Delivery Carriers: Synthesis, Biodegradation, in Vitro Release, and Bioconjugation", Journal of the American Chemical Society, 2007, 129, 5939-5945.

* cited by examiner

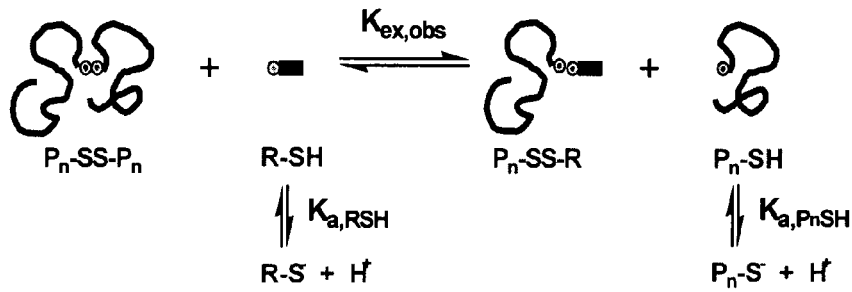

Figure 1. Thiol-disulfide interchange between a disulfide-containing polymer and a low molecular weight thiol.

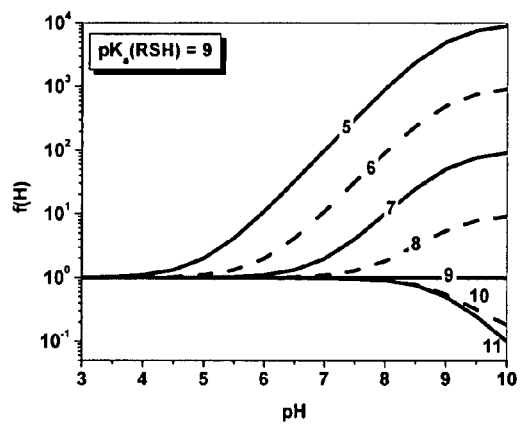

Figure 2. Dependence of f(H) from Figure 1 on pH for the reduction of disulfides $P_n$-$S_2$-$P_n$ with various $pK_a$ values (shown at each curve) of the corresponding thiols $P_n$SH. All reductions are carried out with a thiol RSH with $pK_a = 9$ (model for glutathione).

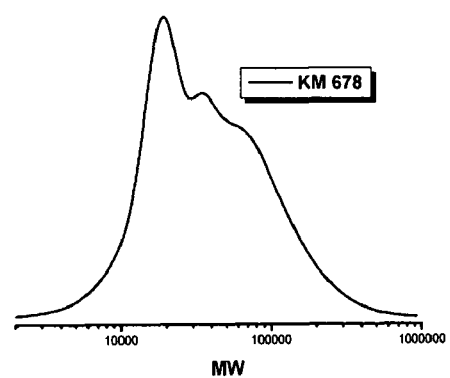
Figure 3. GPC trace for Run KM 678
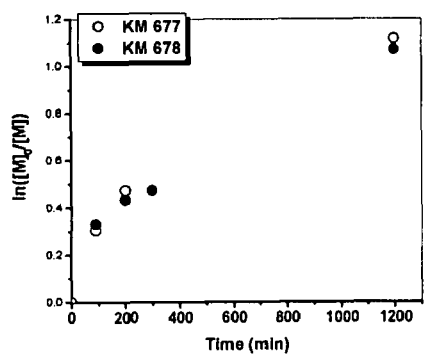
Figure 4. Rate of conversion of MMA to form a gel with two different concentrations of crosslink agents.

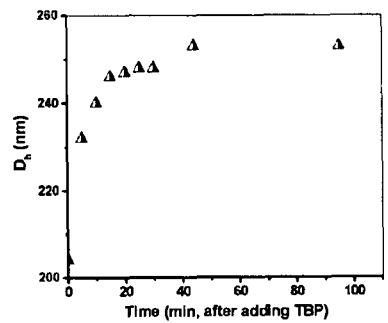
Figure 5. Change of particle size after addition of tributylphosphine (50 μL) to 1mL of the particle dispersion.
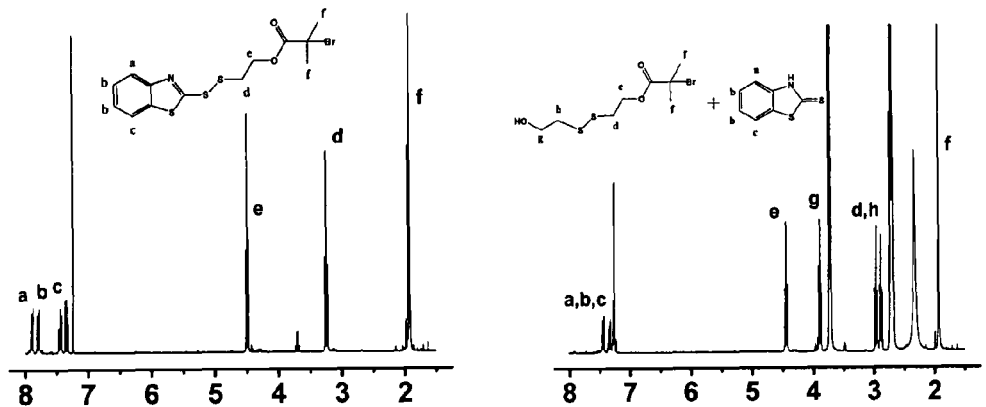
Figure 6. $^1$H-NMR of B-SS-Br initiator and the product formed after reduction by 2-mecaptoethanol.

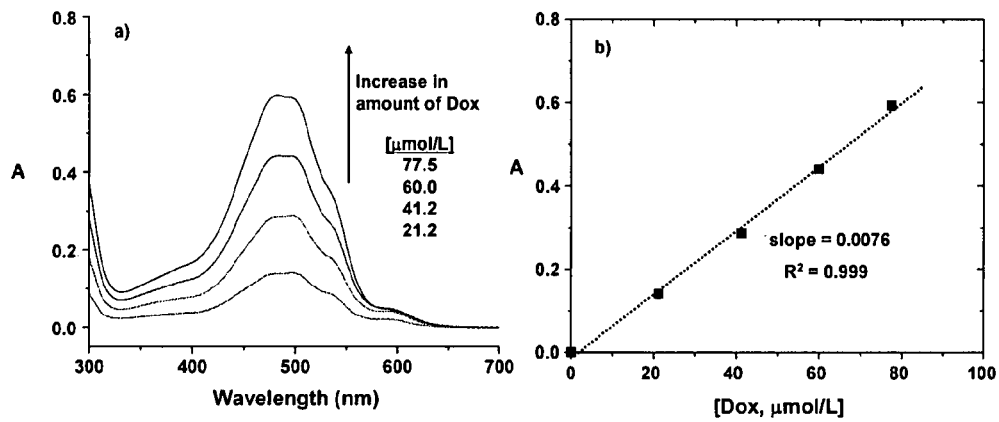
Figure 7. UV spectra of Dox at different concentrations in PBS buffer (a) and plot of absorbance vs. concentration of Dox. The extinction coefficient of Dox ($\varepsilon$) = 7,600 $M^{-1}$ $cm^{-1}$ in PBS.
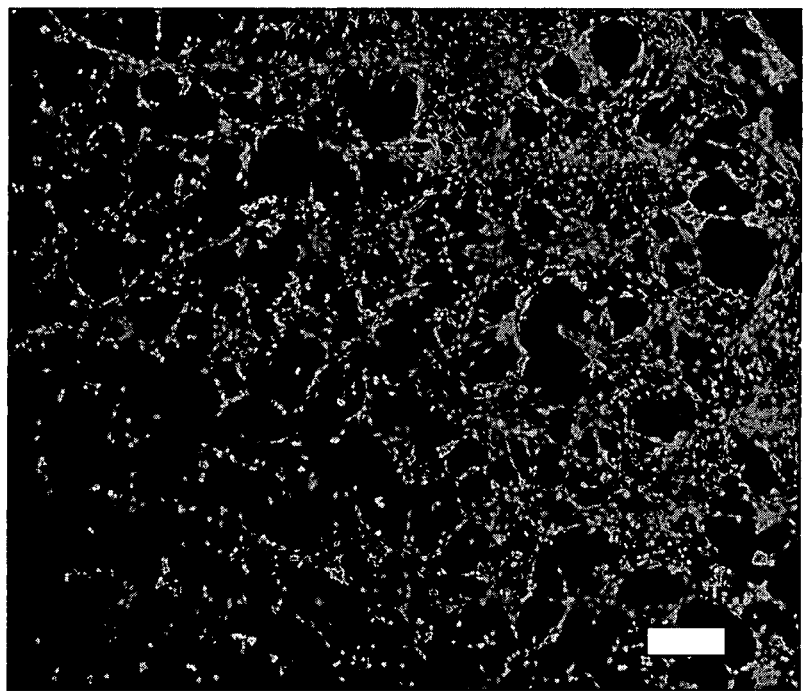
Figure 8. Fluorescent image of live (green) and dead (red) C2C12 cells after 24 h incubation with nanogels. The gels were purified by extensive dialysis in water for 7 days. Scale bar = 200 μm.

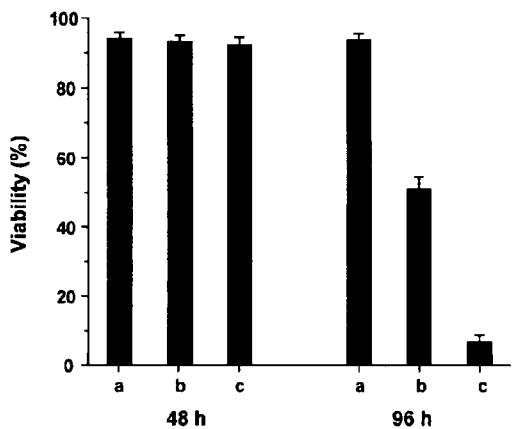
Figure 9. Viability of HeLa cells in the presence of Dox-loaded nanogels before and after the addition of glutathione to release Dox from Dox-loaded nanogels. Glutathione (b) and Dox (c) was added after 48 h incubation. Control (a), Dox-loaded nanogels (b), and Dox (c).
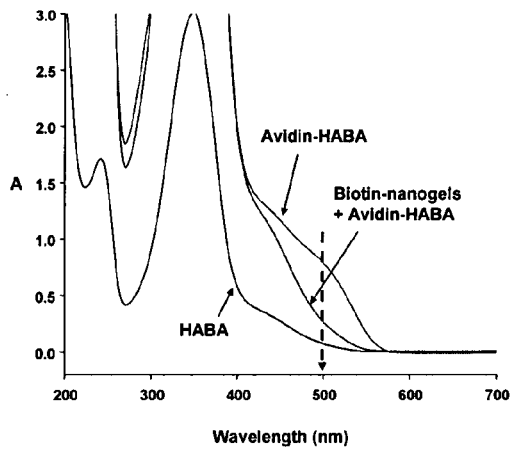
Figure 10. UV spectra of HAB and Avidin-HABA complex before and after addition of biotin-nanogels in PBS buffer.

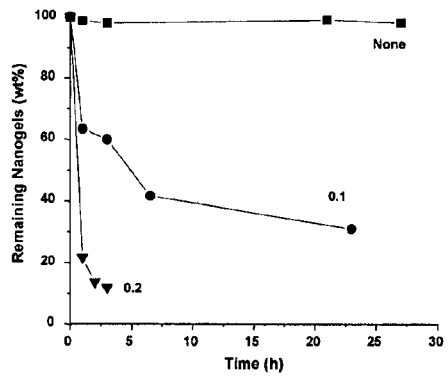

Figure 11. Evolution of weight fraction of remaining nanogels with time in the presence of different amounts of glutathione, expressed as wt ratio of glutathione/nanogels.

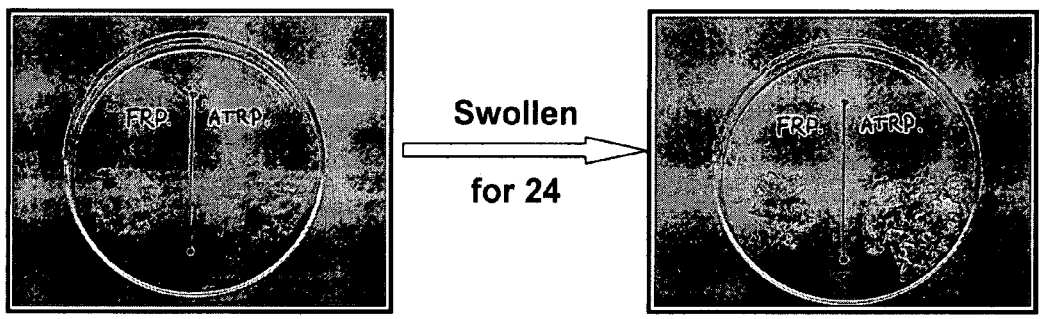

*FRP:*

*MMA: AIBN: EGDMA = 400: 0.625: 20*

*Gel after 5 minutes, with monomer conversion 22%*

*After swollen in toluene, 0.52 g – 1.08 g*

*ATRP:*

*MMA: EBiB: EGDMA: Cu/dNbpy= 400: 1: 20: 0.25*

*Gel after 4 hours, with monomer conversion 25%*

*After swollen in toluene, 0.52 g - 5.08 g*

Figure 12. Swelling of gels formed by FRP and ATRP

Figure 13A. Guest molecules encapsulation using dual crosslinked microgels
- Specific binding sites are not necessary
- Requires high concentration of guest molecules in the uptake step
- Requires accurate control over mesh size to match the size of guest molecules
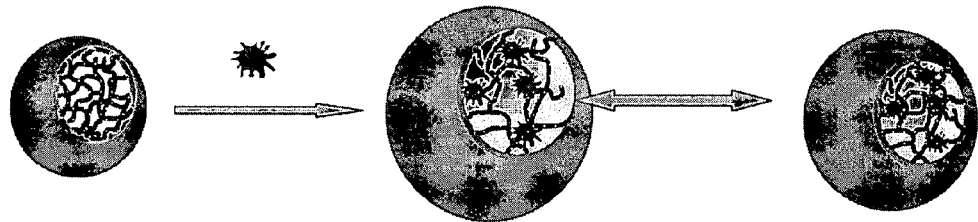

Figure 13B. Guest molecules encapsulation through specific interaction

- High uptake efficiency unaffected by the mesh size
- Requires specific binding sites Schematic of opening, loading and closing of gel particles

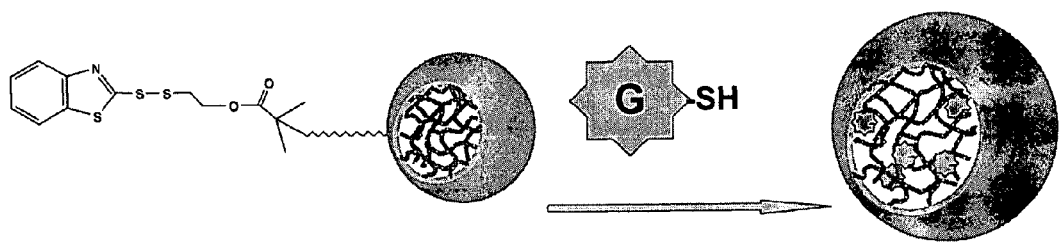

Network consists of permanent C-C bonds
and degradable S-S bonds.

Network loosens and expands after
partial degradation by reduction.
Guest molecules are loaded

Network tightens upon oxidation.
Guest molecules are sealed

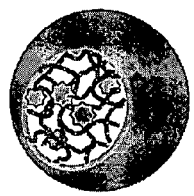

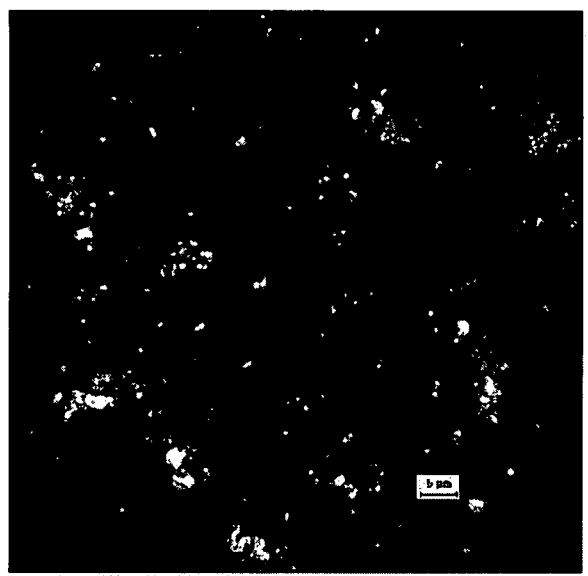
Figure 15. Optical Fluorescence Microscopy image of FITC-avidin-biotin-nanogel conjugates. Scale bar = 5 μm

US 8,367,051 B2

PREPARATION OF FUNCTIONAL GEL PARTICLES WITH A DUAL CROSSLINK NETWORK

CROSS REFERENCE TO RELATED APPLICATIONS

This application is a nationalization of PCT International Application No. PCT/US2007/021684, having an international filing date of Oct. 9, 2007, which claims the priority benefit of U.S. Provisional Application Ser. No. 60/850,453 filed Oct. 9, 2006 and U.S. Provisional Application Ser. No. 60/878,594 filed Jan. 4, 2007, the disclosures of each of which are incorporated herein by this reference.

FIELD OF TECHNOLOGY

The present invention relates to the preparation of functional gel particles with uniform properties comprising a crosslink network wherein a first fraction of the crosslinks in the gel are stable while a second fraction of the crosslinks can be reversibly cleaved. Opening, closing and reopening the reversible crosslinks allows loading of materials within the gel particles, chemical or physical encapsulation for delivery to a pre-selected target and release of encapsulated materials in a second environment. Peripheral or other accessible functionality allows attachment of second functional molecules to the gel thereby modifying the surface properties of the gel and optionally providing hydrophilic and/or a bio-responsive surface.

BACKGROUND

There is a continuing need to develop stable materials that can encapsulate a functional or guest agent, be capable of transportation, be capable of targeting specific environments within a biological species and be able to deliver the desired encapsulated material to different pre-selectable target environments. There is a need for a method to prepare functional gel particles which can encapsulate functional agent(s), allow functionalization of the exterior of the gel particle by attaching targeting surface active agents that can recognize specific environments within a living organism to the exterior of the gel particle, and deliver the particle to the target site where the particle "opens" and delivers the encapsulated or intra-particle attached functional agent(s) to the targeted site. Such materials are exemplified herein.

There is a further need to be able to encapsulate a known amount of functional compound within a gel particle and hold the functional compound within the gel until it is released in the selected environment, at the appropriate time, over the appropriate time frame, or retain the functional compound when added to a different environment until subsequently stimulated to release the agent.

Prior art technologies may accomplish one or more of these objectives but do not accomplish all of these objectives in a single material.

There are a number of processes for the preparation of encapsulated functional materials but these processes depend on the coincidental encapsulation of the functional material during uncontrolled encapsulation procedures and enthalpic control over the release of the drug.

A need therefore exists for a material that has the ability to encapsulate organic and inorganic materials such as, but not limited to pigments or other visually responsive materials, bio-active molecules such as drugs or nano-materials; physically or chemically deliver them to a specific targeted site; and then change the nature of the gel in response to the environment to controllably release the encapsulated material.

SUMMARY OF THE INVENTION

The preparation of functional crosslinked gel particles is disclosed wherein the gel particle comprise a polymeric network of more chemically stable, or in certain embodiments, permanent, crosslink or branch points in the support (or substrate) and with an additional fraction of reversibly cleavable crosslink or branch points that interact to allow the dual functional crosslinked responsive polymeric network to encapsulate and retain an increased volume fraction of guest molecules or function agent within the gel wherein the guest molecules or functional compound can be controllably released from the gel. The preparation of predominately hydrophilic and hydrophobic nanoparticles, microgels and/or macrogels is described with various fractions of stable and cleavable crosslinks within the gel particle. The term "stable" in this case additionally comprises molecules with links that can be slowly degraded (over a period of time greater than 7 days) within a bioactive environment and is not limited solely to C—C bonds. The encapsulating ability of microgel particles is initially exemplified by loading the gels with nano-sized star macromolecules, fluorescent molecules, color pigments, nanoparticles with fluorescent cores, drugs, including anticancer drugs, and nano-composite structures as guest molecules or functional agents.

The added molecules or functional agents can be retained within the gel by at least one interaction with one or more polymeric backbone segments in the gel particle, wherein the at least one interaction is selected from the group consisting of chemical affinity, hydrogen bonding, Van der Waal's interactions, ionic interactions, hydrophilic interactions, hydrophobic interactions, chemical reactions, and combinations thereof.

The surface of the first formed gel can be modified:
  by chain extension of the dormant chain ends with other monomers to form a polymeric shell,
  by reaction with bio-responsive molecules that can be conjugated to the surface of the gel,
  to form (or, by adding) functional groups present on the gel particle surface, to enhance the surface properties of the gel,
  to allow transportation of the gel to a specific biological target environment, and/or
  to seal the encapsulated material within the gel.

In the proximity of the target environment, the degradable or cleavable crosslinks within the loaded particle may open as a consequence of the chemical environment at the location of the target, or can be stimulated to open, and release the encapsulated materials at the targeted site. Subsequent to release of the encapsulated material the "stable" crosslinks can degrade, for example, over a time period of from 7 days to 30 days, allowing the residual gel particle to undergo a slow degradation to polymer fragments having a size below the renal threshold.

Macrogels, microgels and nanogels can be prepared using similar procedures to those detailed in the examples as can hybrid gels wherein the gel is attached to or forms an organic, an inorganic, or a hybrid core which can optionally comprise a delivery system, a functional imaging system or delivery notification system comprising at least one of an imaging agent, magnetic particles, and luminescent compound.

The invention is focused on preparation of a functional gel material comprising a dual crosslink network wherein one fraction of the crosslink network is a responsive crosslink network and another fraction of the crosslink network is a more stable crosslink network. The structure and composition of the gel is selected to allow enhanced encapsulation of one or more functional compounds within the functional gel and attachment of functional agents, including the optional attachment of bio-responsive agents, to the exterior of the nanogels. The responsive gel additionally allows degradation of the responsive or cleavable crosslink network in the gel in a specific targeted environment, and controlled release of one or more encapsulated materials or functional compounds at the targeted site. After release of the encapsulated functional compounds, the more stable crosslink network can slowly degrade forming polymer fragments that can be eluted from the site.

According to one embodiment, the present disclosure provides for a gel particle comprising a polymeric network. The polymeric network comprises vinyl monomeric units, at least one first divinyl monomeric unit; wherein the vinyl groups are connected by a chemically stable linking group; and at least one second divinyl monomeric unit, wherein the vinyl groups are connected by a cleavable linking group. The polymeric network is formed using a controlled polymerization process and the first divinyl monomeric units form chemically stable crosslinks within the polymeric network and the second divinyl monomeric units form cleavable crosslinks within the polymeric network.

Further embodiments provide for a process for preparing a gel particle. The process comprises polymerizing by a controlled polymerization process in a biphasic medium a system comprising vinyl monomeric units, at least one first divinyl monomeric unit and at least one second divinyl monomeric unit and forming a polymeric network comprising chemically stable crosslinks and cleavable crosslinks. In the first divinyl monomeric unit the vinyl groups are connected by a chemically stable linking group and in the second divinyl monomeric unit the vinyl groups are connected by a cleavable linking group.

Still further embodiments provide for a process for delivering an active compound to a target site. The process comprises forming a gel particle comprising a polymeric network comprising chemically stable crosslinks and cleavable crosslinks, encapsulating one or more functional compounds in an interior portion of the gel particle, delivering the gel particle to a target site, cleaving at least a portion of the cleavable crosslinks of the polymeric network, and increasing a swelling ratio of the gel particle such that the one or more functional compounds is released from the interior portion of the gel particle. The polymeric network is formed by a controlled polymerization process.

BRIEF DESCRIPTION OF THE FIGURES

A gel with various properties as set forth herein is illustrated, but not limited, by the following figures.

FIG. 1 illustrates thiol-disulfide interchange between a disulfide-containing polymer and a low molecular weight thiol.

FIG. 2 illustrates dependence of f(H) from FIG. 1 on pH for the reduction of disulfides $P_n$—$S_2$—$P_n$ with various $pK_a$ values (shown at each curve) of the corresponding thiols $P_n$SH.

FIG. 3 illustrates a GPC trace from polymer prepared in Run KM 678

FIG. 4 illustrates the rate of conversion of MMA forming gel particles with two different concentrations of crosslink agents.

FIG. 5 illustrates the of particle size after addition of tributylphosphine (50 μL) to 1 mL of the particle dispersion.

FIG. 6 illustrates $^1$H-NMR spectra of a B—SS—Br initiator and the product formed after reduction by 2-mecaptoethanol.

FIG. 7 illustrates UV spectra of different concentrations of Dox in PBS buffer (a) and plot of absorbance vs. concentration of Dox.

FIG. 8 illustrates a fluorescent image of live (green) and dead (red) C2C12 cells after 24 h incubation with nanogels. Scale bar=200 μm.

FIG. 9 illustrates the viability of HeLa cells in the presence of Dox-loaded nanogels before and after the addition of glutathione to release Dox from Dox-loaded nanogels.

FIG. 10 illustrates UV spectra of HAB and Avidin-HABA complexes before and after addition of biotin-nanogels in PBS buffer.

FIG. 11 illustrates the evolution of weight fraction of remaining nanogels with time in the presence of different amounts of glutathione, expressed as wt. ratio of glutathione/nanogels.

FIG. 12 compares the swelling of gels formed by free radical polymerization and atom transfer radical polymerization (ATRP).

FIG. 13A displays a schematic illustrating first approach to encapsulation of an agent in dual crosslinked gel particle.

FIG. 13B displays a schematic illustrating a second approach to encapsulation of an agent in a dual crosslinked gel particle.

FIG. 15 presents an Optical Fluorescence Microscopy image of FITC-avidin-biotin-nanogel conjugates. Scale bar=5 μm

DETAILED DESCRIPTION

Figure 14:
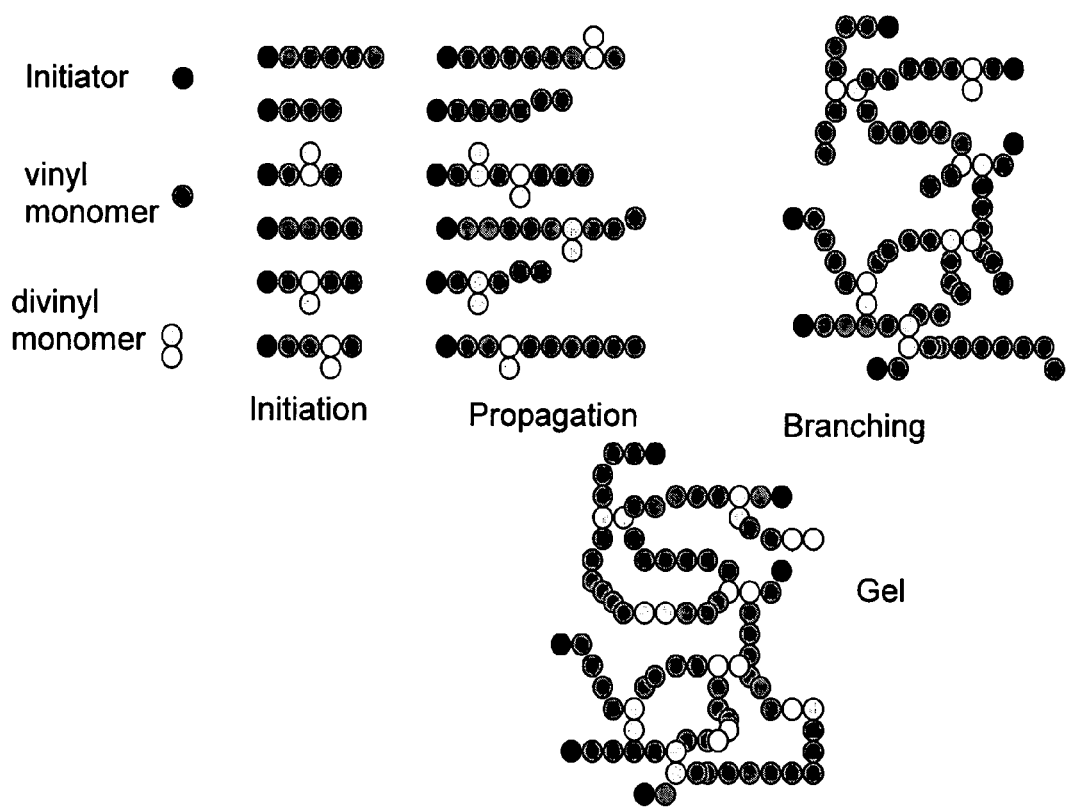
FIG. 14 displays a schematic of growth a copolymer comprising a divinyl monomer, a vinyl monomer and an initiator.

The gel particles, or functional particles, of the present invention are prepared by copolymerizing one or more divinyl compounds with one or more vinyl monomers in a controlled radical copolymerization process thereby forming gel particle having a polymeric network comprising a crosslinked network, optionally comprising two or more different types of crosslink units. In one embodiment of the invention, the gel comprises two or more crosslinking agents where at least a fraction of a first crosslinking agent can be reversibly cleaved, for example, under a specific set of chemical or biological conditions, and wherein a second crosslinking agent forms chemically stable crosslinks or comprise units that can slowly degrade in a biological environment. This is exemplified in one embodiment by preparation of micro-gel particles further comprising crosslinks that degrade in a reducing environment, such as that present in cancer cells or cancerous tumors.

All documents cited in the Detailed Description are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

As used herein, the terms "guest compound", "functional compound" and "encapsulated compound" are used synonymously and include one or more compounds that are physically or chemically encapsulated within the gel particle, such as, by any process described herein. Examples of guest compounds or functional compounds which may be encapsulated into the gel particles of the present disclosure include, for example, nano-size star macromolecules, fluorescent molecules, color pigments, inorganic nanoparticles, nanoparticles with a fluorescent core, biologically active compounds, drugs, cancer drugs, nanocomposite structures, biospecific molecules, and combinations of any thereof.

The vessels that supply cancerous tumor with blood show several abnormalities such as deficiency in pericytes, aberrant basement membrane formation, and a large proportion of proliferating endothelial cells. The blood flow is frequently irregular and the hydrostatic pressure in solid tumors is usually high, which may cause restriction and even collapse, of capillaries. This leads to poor blood supply and formation of hypoxic regions in the tumor. Tumor vasculature is often hyperpermeable to proteins and other macromolecules (3-10 times larger permeability compared to regular tissues), which is thought to be a means for the tumors to acquire nutrients and structural components. The "trapping" of macromolecules by tumors is termed the enhanced permeability and retention (EPR) effect, and provides a means to deliver drug-polymer conjugates specifically to the tumor. [Maeda, H.; Greish, K.; Fang, J. *Adv. Polym. Sci.* 2006, 193, 103.] Due to the unique features of the tumor microenvironment, targeted drug release in tumors is feasible. Tumor tissues are often hypoxic or slightly more reducing, and also more acidic than normal tissues, and both features have been utilized in selective drug delivery in malignant tissues. [Brown, J. M.; Wilson, W. R. *Nature Rev. Cancer* 2004, 4, 437.]

Polymer-drug conjugates have been used for treatment of various diseases including cancer. There are several major requirements for the polymer to be used as a drug carrier:
  i) it has to be biocompatible and should not cause any reaction to the immune system,
  ii) molecular weight has to be lower than the renal threshold (in other words, control over molecular weight is an important factor),
  iii) the drug should be controllably released (i.e., if it is attached to the polymer via chemical bonds, they should degrade, preferably selectively, in the targeted tissue), and
  iv) the carrier should be easy to functionalize with targeting molecules via links that do not prematurely degrade in the body.
The last three requirements are a challenge from synthetic chemistry point of view.

Radical polymerization is the synthetic technique of choice for formation of polymer drug conjugates due to the large variety of monomers that can be polymerized; tolerance of the polymerization process to moisture, carbon dioxide, and impurities often encountered in industrial systems; and an experimental setup that does not require special equipment. However, the standard free radical polymerization process yields polymers with highly uncontrolled molecular weight, broad molecular weight distribution, compositional variation due to continuous initiation, fast termination and/or transfer reactions, and furthermore it is generally not possible to prepare end-functionalized polymers by standard radical polymerization processes.

According to various embodiments disclosed herein, Controlled Radical Polymerization (CRP) processes, including Atom Transfer Radical Polymerization (ATRP), overcomes these process limitations and is a robust method for the synthesis of polymers with predetermined molecular weight, narrow molecular weight distribution, controlled composition, molecular architecture and functionality. Many polymer composites have been successfully prepared by ATRP The classical theory dealing with the molecular weight growth and gel point predication is Flory-Stockmeyer's mean-field statistical theory, which projects that the critical condition (gel point) for the formation of an "infinite" polymer network is that the number of cross-linking unit ($N_c = \rho DP_{n,l}$) per primary chain is equal to unity (Eq. 1).

$$\rho DP_{n,l} = \frac{DP_{n,b} - DP_{n,l}}{DP_{n,b}} = 1 \qquad \text{Eq. 1}$$

in which $DP_{n,b}$ represents the degree of polymerization (DP) of the branched polymer; $DP_{n,l}$ means the DP of the linear primary chain; and $\rho$ is the branching density, i.e. the molar fraction of the double bond residing in the multivinyl crosslinker.

In one exemplified embodiment of the process, the polymer drug conjugates are functional gel microparticles which can be prepared by ATRP, or other CRP processes such as nitroxide mediated polymerization (NMP) or reversible addition fragmentation transfer (RAFT), in miniemulsion or reverse miniemulsion polymerization systems where (co)monomers, such as vinyl monomeric units, are copolymerized with a pre-selected mole ratio of divinyl permanent crosslinkers and divinyl degradable crosslinkers of known reactivity ratio with the backbone (co)monomers. The ratio of targeted degree of polymerization (DP) to added mole fraction of crosslinking agents provides control over the "mesh size" of the formed gel. Addition of AB* monomers can also modify the mesh size by incorporation of three arm branch points into the network. The size of particles formed in miniemulsion or emulsion polymerization systems can be controlled within the range of 50 to 500 nm, whereas smaller particles, for example, particles greater that 5 nm in diameter, are formed in micro-emulsion systems and larger particles may be formed in certain suspension systems. Therefore, in various aspects of the present disclosure, gel particles of any desired size can be formed by selecting the appropriate biphasic polymerization method. Solution or bulk polymerization can also be employed if a lesser degree of control over particle dimensions is acceptable. In certain embodiments, the gel particle may have an average diameter of at least 5 nm. In other embodiments, the gel particle may be a nanogel, a microgel, a macrogel, or a bead.

For example, according to one embodiment of the present disclosure, the gel particle comprises a polymeric network. The polymeric network is formed by the controlled polymerization of a system comprising vinyl monomeric units; at least one first divinyl monomeric unit, wherein the vinyl groups are connected by a chemically stable tether; and at least one second divinyl monomeric unit, wherein the vinyl groups are connected by a cleavable tether. In the polymeric network the first divinyl monomeric unit forms chemically stable crosslinks within the polymeric network and the second divinyl monomeric unit forms cleavable crosslinks within the polymeric network. According to certain embodiments, at least a portion of the cleavable crosslinks are cleavable in a predetermined chemical environment or a predetermined biological environment, such as, for example, a specific cellular environment, as described herein. In certain embodiments, the cleavable crosslinks are reversibly cleavable crosslinks. That is, at least a portion of the cleavable crosslinks may be selectively cleaved under specific chemical or biochemical conditions and the cleaved crosslinks may be selectively reformed under other specific chemical or biochemical conditions.

Biodegradable or cleavable crosslinkers include peptides, [Khelfallah, N. S.; Decher, G.; Mesini, P. J. *Macromolecular Rapid Communications* 2006, 27, 1004-1008] anhydrides,

[U.S. application Ser. No. 10/034,908] and oligo(lactate) esters [Huang, X.; Lowe, T. L. *Biomacromolecules* 2005, 6, 2131-2139]. These crosslink agents and the resulting hydrogels are degraded to water-soluble polymers. Disulfides of the type R—S$_2$—R (both linear or cyclic) present another class of (bio)degradable groups which can be cleaved to the corresponding thiols in the presence of reducing agents, such as, but not limited to, tributyl phosphine (Bu$_3$P), tris(2-carboxyethyl)phosphine (TCEP), and dithiothreitol (DTT). [Houk, J.; Whitesides, G. M. *J. Am. Chem. Soc.* 1987, 109, 6825; Tsarevsky, N. PhD Thesis CMU 2005, Chapter 6] Other degradable links such as hydrazides, hydrazines, hydrazones, acetals, oximes, imines, Schiff bases or urethanes, while not as biologically benign may also be used to target different rates of degradation in different environments, as can crosslinking agents comprising degradable oligo/polymer segments such as a polysaccharide, polyesters, a peptide or protein, chitin, or chitosan.

Since controlled radical polymerization processes are envisioned as one process for the preparation of the functional gels, a series of disulfide-functionalized dimethacrylate crosslinkers have been developed to exemplify the preparation of (bio)degradable bulk gels and gel particles. The degradation of disulfides has been utilized for the preparation of various polymeric materials, including stimulus-responsive gelators, [Li, C.; Madsen, J.; Armes, S. P.; Lewis, A. L. *Angew. Chem. Int. Ed.* 2006, 45, 3510] reversible shell-crosslinked micelles, [Li, Y.; Lokitz, B. S.; Armes, S. P.; McCormick, C. L. *Macromolecules* 2006, 39, 2726] miktoarm star copolymer, [Gao, H.; Tsarevsky, N. V.; Matyjaszewski, K. *Macromolecules* 2005, 38, 5995] and polymer capsules. [Zelikin, A. N.; Quinn, J. F.; Caruso, F. *Biomacromolecules* 2006, 7, 27]

In various embodiments, the polymeric networks may comprise one or more polymer segments having a controlled topology, such as a topology resulting from a controlled radical polymerization, for example an ATRP polymerization. The polymeric segments may comprise vinyl monomeric units selected from hydrophilic or polar monomeric units, hydrophobic or non-polar monomeric units, and various combinations thereof. In one embodiment of the present disclosure, ATRP is employed in miniemulsion and in inverse miniemulsion for the synthesis and functionalization of stable (bio)degradable crosslinked gel nanoparticles comprising either hydrophobic or hydrophilic, water-soluble polymers respectively in the presence of a disulfide-functionalized dimethacrylate (DMA). Use of ATRP for the formation of the gel particles allows the preparation of materials with many useful features. Since the process is a radical based polymerization process, one can therefore incorporate a wide spectrum of functional monomers into the gel. The use of a radical process also allows facile cross-propagation between monomer units and the crosslink agents can therefore be incorporated into the gel in a predictable manner by consideration of the reactivity ratio's; forming either a random or statistical distribution of crosslinks along the polymer backbone or a gradient distribution of either or both the permanent crosslinks and cleavable crosslinks. The resulting particles preserve a high degree of, functional agents, such as halide end-functionality within the gel to enable further chain extension to form crosslinked gel/functional block copolymers and/or functionalization with bio-related molecules, such as by utilizing click reactions, such as those described in PCT/US05/007264.

In one embodiment of the process, the gel particles comprise a fraction of crosslinks that are degradable or cleavable in a reducing environment and in a further embodiment of the process a fraction of crosslinks that are slowly degradable in a biological environment to individual polymeric chains with relatively narrow molecular weight distribution ($M_w/M_n$<1.5) and a molecular weight below the renal threshold. Some suitable slowly degradable functional groups have been disclosed in PCT/US04/09905. The use of ATRP allows the formation of a uniformly crosslinked network in one or more segments of the individual gel particles. This uniform structure formed by a CRP is anticipated to improve control over the release of encapsulated functional agents and the molecular weight or size of the final degraded polymer fragments can be controlled to be below the renal threshold. The predictable and controllable properties of the gel particles prepared herein include among others, swelling ratio, degradation behavior, and colloidal stability. Therefore, gel particles prepared by ATRP are superior to those prepared by conventional free radical inverse miniemulsion polymerization. (as shown in FIG. 12) In one embodiment, water swellable nanogels are prepared in one step in an inverse miniemulsion polymerization process and these hydrophilic particles will provide enhanced circulation time of the loaded nanogels in the blood.

In another embodiment of the process, hydrophobic gel particles are prepared in a miniemulsion polymerization process that can be loaded with hydrophobic drugs. In a further embodiment, the first formed hydrophobic gel particles further comprises a water swellable or water compatible shell to enhance circulation time of the loaded core/shell nanogels in the blood.

The unique properties of the well-defined functional nanogels prepared by the newly developed method disclosed herein make these gel particles useful materials for biological and biomedical applications.

In a preferred exemplary embodiment, the nanogels are constructed and functionalized to specifically target cancer cells. This embodiment exemplifies how the gel network can be designed for a specific task, such as selectively carrying large doses of a functional compound, such as drugs, to tumor sites with little drug loss to healthy cells. Because tumor environments are more reducing and more acidic than normal tissues, the embodiment of the gel network directed to this use will be predominately crosslinked with biodegradable linkages that are preferentially cleaved in chemical environments resembling those found in cancer tumors, thereby releasing the encapsulated drugs within the tumor or in proximity to the tumor.

CRP allows control over molecular weight and each polymer fragment, after further degradation, can have a size or molecular weight lower than the renal threshold allowing elution from the body.

The surface of the gel particles, such as the gel nanoparticles, may be functionalized with compounds, such as surface reactive agents, for example, surface reactive agents targeting overexpressed receptors on cancer cells, e.g., folic acid or luteinizing hormone-releasing hormone (LHRH), which are overexpressed in breast, prostate, and ovarian cancer cells, and are not expressed detectably in most visceral organs as the targeting ligands. Different surface reactive agents targeting different receptors can be attached to target other cancers or diseases such as interleukin-3 receptor subunits on defined subpopulations of acute myeloid leukemia; peptabody-EGF apoptosis inducer targeting ErbB1 receptor overexpressing cancer cells; endothelin (ET)-1 targeting its receptors ET-A and ET-B and others such as those discussed in recent review articles. [see, *Expert Opinion on Therapeutic Targets* 2006, 10, 281-287; *Expert Review of Anticancer*

Therapy 2006, 6, 73-81; Cytotoxins and Immunotoxins for Cancer Therapy 2005, 97-114 and Medicinal Research Reviews 2002, 22, 225-250.]

In one embodiment, the gel particles and polymeric networks further comprises stable crosslink agents such as an ester linkage, or other chemical link that slowly degrades in biological systems over a longer period of time, such as greater than 7 to 30 days, or more, thereby allowing complete degradation of the gel into fragments below the renal threshold after delivery of the drug is completed. In a specific embodiment, the polymeric network may degrade over a period of time from 7 days to 30 days or more, to form polymer fragments having a size and/or molecular weight below the renal threshold.

In non-limiting exemplary procedures, aqueous miniemulsion and inverse miniemulsion polymerization processes were employed to form hydrophobic and hydrophilic gel particles respectively, each displaying a final particle size controlled by consideration of the initial surfactant to monomer ratio. A valuable characteristic of both embodiments of the double-crosslinked systems is that the networks can be opened and closed upon exposure to different chemical environments. For example, in one embodiment of the invention, the reversibly cleavable crosslink is exemplified by a reversibly cleavable crosslinking agent comprising a disulfide bond. In a reducing environment, the disulfide bond cleaves to two thiol-end groups as shown below in Scheme 1 and allows the first formed gel particle to swell to a higher swelling ratio or greater diameter. The "open" gel particle is stable if the ratio of stable crosslinking agents incorporated into the gel to initiators initially added to the reaction, are greater than 1:1 as illustrated in scheme 1. For example, in certain embodiments, the gel particles may further comprise a residue of an initiator, wherein the ratio of the first divinyl monomeric unit (i.e., the stable crosslinking agent) to the first added initiator is greater than 1:1.01.

Scheme 1. Opening of a dual crosslinked gel particle containing disulfide links in a reducing environment;
○ represents a stable crosslink while
● represents a disulfide link.

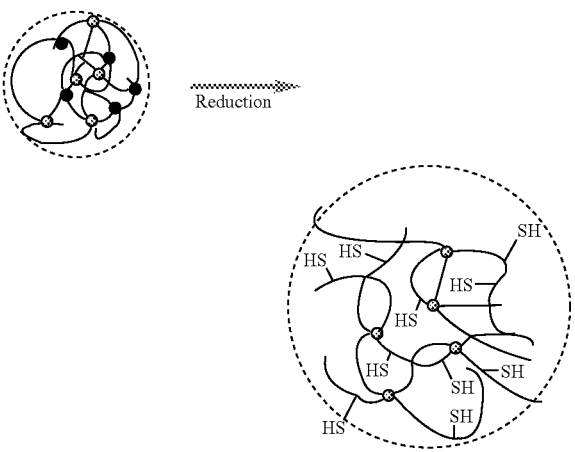

One tool that can be employed to tailor the degradability or cleavability of the cleavable disulfide linker is provided by the fact that the reduction of a disulfide bond, yielding the corresponding thiols, with various efficient reducing agents such as phosphines, metal hydrides and active metal/acid combinations has been widely used in protein analysis.

Thiols (RSH) may also be used to cleave the disulfide crosslinks and equilibrium is established relatively quickly (see FIG. 1). This interchange is of primary importance in biological redox systems. The interchange is a nucleophilic substitution reaction with the thiolate anion $RS^-$ as nucleophile. The rate and the equilibrium position depend on the degree of ionization of the participating thiols, and therefore on their $pK_a$ values and the solution pH, as shown in FIG. 2 ($K_{ex}$ is the equilibrium constant at sufficiently low pH, at which none of the thiols is appreciably dissociated). The dependence of the function f(H), which determines the values of $K_{ex,obs}$, upon pH for reduction of several disulfides $P_n$—$S_2$—$P_n$ with a thiol of $pK_a(RSH)=9$ is shown in FIG. 2. The pKa value of the thiol group of the model reducing agent RSH is the same as that of glutathione, the most important biological reducing agent ($pK_a(GSH)=8.9$-$9.2$). [Schafer, S. Q.; Buettenr, G R. Free Radical Biol. Med. 2001, 30, 1191.] The exchange equilibrium can be shifted to the right or the left side, as pH of the medium is increased depending on the $pK_a$ value of the produced thiol $P_n$SH. Incorporation of this embodiment into the concept of the nanogel particles disclosed herein allows the rational synthesis of cleavable polymer networks with internal disulfide link(s) that will be cleaved only at a certain pH. Since tumor tissues are both reducing and acidic, the development of polymeric networks and gel particles in which at least a portion of the cleavable crosslinks optimally cleave at certain values of the medium pH and in reducing environment is an important tool for the development of tumor selective drug-carriers for cancer therapy.

Different cleavable crosslinking agents, such as, for example, different cleavable disulfide crosslinks, can be selected to allow different rates of degradation in different tumor environments. Thus, according to certain embodiments, the cleavable crosslinks may comprise two or more cleavable functionalities, wherein the two or more cleavable functionalities have different rates of cleavage in different chemical or biological environments. The synthesis of a non-limiting selection of disulfide crosslinkers with different pH responsive degradation or cleaving behavior is shown in Scheme 2. Analogs or derivatives of these agents can also be prepared to provide disulfide S—S linkages that degrade or cleave at different rates in the expected cancerous environment.

Scheme 2. Synthesis of difunctional biodegradable crosslinkers with different pH dependence of the reductive degradation. (R = H or Me)

Crosslinkers

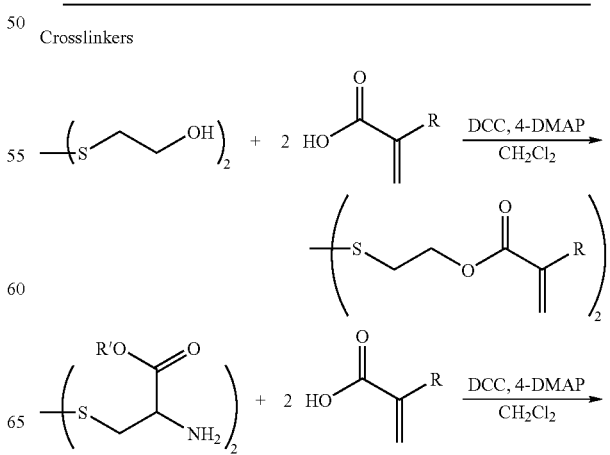

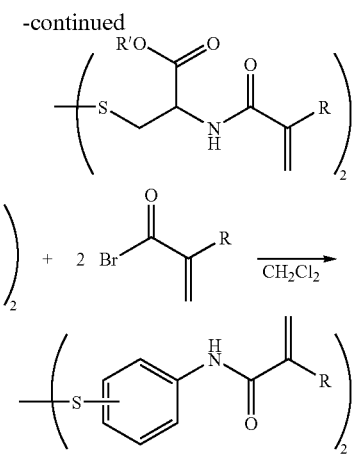

In one embodiment of the gel particles of the invention, two or more different degradable crosslinkers are incorporated into the gel to control the rate of "opening" of the gel particle in the target environment. In this embodiment, control over the rate of opening of the gel particle provides control over the rate of release of a guest compound or functional compound encapsulated within the gel in the targeted environment. The different cleavable crosslinkers can comprise the same cleavable functionality, such as differently substituted disulfide links, or different compositionally cleavable links, such as a disulfide and a peptide.

In one embodiment of the invention, the guest compound desired to be encapsulated within the gel can be added during the gel formation process. For example, according to this embodiment, the guest compound or functional compound may be mixed with the polymer system during or prior to the polymerization process and the guest compound or functional compound is encapsulated within the gel particle as the polymeric network of the gel particle is formed. According to certain embodiments, the cleavable crosslinks may then later be cleaved to release the guest particle or functional agent, for example, in a predetermined chemical or biological environment.

In another embodiment, the guest compound or functional compound may be added at a later time, and can diffuse into the gel based on the preferred chemical environment within the gel or can be added to the gel in a separate step. For example, in one embodiment, at least a portion of the reversibly cleavable crosslinks may be cleaved, thereby swelling the gel particle to form and "open" gel. The guest compound can be added to the "open" gel and can migrate or diffuse into an interior portion of the "open" gel. Then the gel can be "closed" by reforming the reversibly cleavable crosslinks, thereby encapsulating the guest compound. The definitions of "open" and "closed" will become clear during the following discussion and are schematically illustrated in FIGS. 13A and 13B.

In one embodiment, the gels are preferentially prepared using a controlled "living" polymerization process, such as a controlled radical polymerization, for example, an ATRP polymerization process, in either a bulk, a solution, or a suspension polymerization processes and gel particles formed during a post polymerization step or where additional control over the gel particle size is desired the gel particles can preferentially be prepared by conducting a controlled or living copolymerization in a biphasic media where the dispersed phase comprises the gel precursor. The biphasic polymerization can be formed with either a continuous aqueous phase or a continuous non-aqueous phase, such as an organic phase, an ionic liquid, or a super critical fluid, and conditions can be selected to form gel particles with particle diameters from 5 nm upwards, for example, from 5 nm to 500 nm, since the conditions selected for the biphasic polymerization can be selected from a microemulsion, a miniemulsion, emulsion or suspension polymerization process.

There are many polymerization processes that are considered to be controlled, living or "living" including ionic polymerization processes and radical polymerization processes. While all are hereby incorporated into the definition of a controlled "living" polymerization process, the procedure will be discussed employing a controlled radical polymerization process since radical processes allow incorporation of a wider spectrum of polymerizable monomers than ionic processes. One of the most robust controlled radical polymerization processes is known as atom transfer radical polymerization (ATRP) which is disclosed, for example, in U.S. Pat. Nos. 5,763,548; 5,807,937; 5,789,487; 5,945,491; 6,111,022; 6,121,371; 6,124,411; 6,162,882; 6,407,187; 6,512,060; 6,538,091; 6,541,580; 6,624,262; 6,624,263; 6,627,314; 6,759,491; and U.S. patent application Ser. Nos. 09/534,827; 09/972,056; 10/034,908; 10/269,556; 10/289,545; 10/638,584; 10/860,807; 10/684,137; 10/781,061 and 10/992,249 all of which are herein incorporated by reference. ATRP has also been discussed in numerous publications and reviewed in several book chapters. [*ACS Symp. Ser.*, 1998, 685; *ACS Symp. Ser.*, 2000; 768; *Chem. Rev.* 2001, 101, 2921-2990; *ACS Symp. Ser.*, 2003; 854; *ACS Symp. Ser.*, 2006; 944.] Within these published articles and book chapters similar polymerization systems may be referred to by different names, such as transition metal mediated polymerization or atom transfer polymerization, but the processes are similar and referred to herein as "ATRP".

As discussed herein, the reversible crosslinks can be opened by chemical procedures or they can be opened by biological procedures.

"Biological" refers to materials for which the cleavage or degradation process is at least partially mediated by, and/or performed in, a biological system.

"Degradation", such as the slow degradation discussed herein, refers to a chain scission process by which a polymer chain is cleaved into tethered polymeric segments or completely broken apart into oligo/polymer fragments or segments with a size or molecular weight below the renal threshold. According to certain embodiments, the degradation may occur over a time period ranging from 7 days to 30 days, or more.

"Chain scission" may occur through various mechanisms, including, for example, by chemical reaction (e.g., hydrolysis) or by a thermal or photolytic process. Chain scission or polymer degradation may be characterized, for example, using the swelling ratio of the gel particle, which monitors the particle size as the reversible crosslinks are opened then closed and provides a measurement of expected changes during gel particle erosion and drug release.

"Biodegradable" also refers to materials that may be degraded by a process mediated by, and/or performed in, a living biological system. Heller indicated that depending on the type of polymer, degradation generally occurs by one of three basic mechanisms (see, e.g., Heller, J., "CRC Critical Review in Therapeutic Drug Carrier Systems," 1984, 1(1), 39-90); Siepmann, J. et al., *Adv. Drug Del. Rev.*, 2001, 48, 229-247):

(1) water-soluble polymers that have been insolubilized by covalent crosslinks that solubilize as the crosslinks or the backbone undergo a hydrolytic cleavage;

(2) polymers that are initially water insoluble are solubilized by hydrolysis, ionization, or pronation of a pendant group; and (3) hydrophobic polymers that are converted to small water-soluble molecules by backbone cleavage.

Techniques for characterizing degradation include thermal analysis (e.g., DSC), X-ray diffraction, scanning electron microscopy (SEM), electron paramagnetic resonance spectroscopy (EPR), NMR imaging, and recording mass loss during an erosion experiment. For microspheres, several particles size measurement techniques may be applied to monitor the size evolution of crosslinked gels versus time as the reversible crosslinks are cleaved and reformed.

As used herein, "analogue" refers to a chemical compound that is structurally similar to a parent compound, but differs slightly in composition (e.g., one atom or functional group is different, added, or removed). The analogue may or may not have different chemical or physical properties than the original compound and may or may not have improved biological and/or chemical activity. For example, the analogue may be more hydrophilic or it may have altered reactivity as compared to the parent compound. The analogue may mimic the chemical and/or biologically activity of the parent compound (i.e., it may have similar or identical activity), or, in some cases, may have increased or decreased activity. The analogue may be a naturally or non-naturally occurring (e.g., recombinant) variant of the original compound. Other types of analogues include isomers (enantiomers, diasteromers, stereoisomers, and the like) and other types of chiral variants of a compound, as well as structural isomers. The analogue may be a branched or cyclic variant of a linear compound. For example, a linear compound may have an analogue that is branched or otherwise substituted to impart certain desirable properties (e.g., improve hydrophilicity or bioavailability).

As used herein, "derivative" refers to a chemically or biologically modified version of a chemical compound that is structurally similar to a parent compound and (actually or theoretically) derivable from that parent compound. A "derivative" differs from an "analogue" in that a parent compound may be the starting material to generate a "derivative," whereas the parent compound may not necessarily be used as the starting material to generate an "analogue." A derivative may or may not have different chemical or physical properties of the parent compound. For example, the derivative may be more hydrophilic or it may have altered reactivity as compared to the parent compound. Derivatization (i.e., modification) may involve substitution of one or more moieties within the molecule (e.g., a change in a functional group). For example, a hydrogen may be substituted with a halogen, such as fluorine or chlorine, or a hydroxyl group (—OH) may be replaced with a carboxylic acid moiety (—COOH). The term "derivative" also includes conjugates, and prodrugs of a parent compound (i.e., chemically modified derivatives which can be converted into the original compound under physiological conditions). For example, the prodrug may be an inactive form of an active agent. Under physiological conditions, the prodrug may be converted into the active form of the compound. Prodrugs may be formed, for example, by replacing one or two hydrogen atoms on nitrogen atoms by an acyl group (acyl prodrugs) or a carbamate group (carbamate prodrugs). More detailed information relating to prodrugs is found, for example, in Fleisher et al., *Advanced Drug Delivery Reviews* 19 1996, 115; "Design of Prodrugs," H. Bundgaard (ed.), Elsevier, 1985; or H. Bundgaard, *Drugs of the Future*, 16, 1991, 443. The term "derivative" is also used to describe all solvates, for example hydrates or adducts (e.g., adducts with alcohols), active metabolites, and salts of the parent compound. The type of salt that may be prepared depends on the nature of the moieties within the compound. For example, acidic groups, for example carboxylic acid groups, can form, for example, alkali metal salts or alkaline earth metal salts (e.g., sodium salts, potassium salts, magnesium salts and calcium salts, and also salts with physiologically tolerable quaternary ammonium ions and acid addition salts with ammonia and physiologically tolerable organic amines such as, for example, triethylamine, ethanolamine or tris-(2-hydroxyethyl)amine). Basic groups can form acid addition salts, for example with inorganic acids such as hydrochloric acid, sulfuric acid or phosphoric acid, or with organic carboxylic acids or sulfonic acids, such as acetic acid, citric acid, benzoic acid, maleic acid, fumaric acid, tartaric acid, methanesulfonic acid or p-toluenesulfonic acid. Compounds which simultaneously contain a basic group and an acidic group, for example a carboxyl group in addition to basic nitrogen atoms, can be present as zwitterions. Salts can be obtained by customary methods known to those skilled in the art, for example by combining a compound with an inorganic or organic acid or base in a solvent or diluent, or from other salts by cation exchange or anion exchange In an ATRP that is conducted to prepare a dual functional crosslinked gel particle, as disclosed herein, the gel precursor can comprise one or more monofunctional vinyl monomer units and/or monofunctional oligo-polymer macromonomers, such as PEOMA, that are copolymerized with one or more difunctional vinyl monomer units and/or difunctional oligo-polymer macromonomers. In a controlled polymerization process, the ratio of monofunctional to multi-functional monomer provides the average degree of polymerization (DP) between the formed crosslinks in the formed gel particle. Optional addition of AB* inimer, i.e molecules that comprise an initiating functionality and a (co)polymerizable vinyl group, provides a method of forming three arm crosslink or branch point, in addition to a four arm crosslink formed by incorporation of both functional groups in a divinyl crosslink agent into the polymerization process, thereby allowing synthesis of gels with higher swelling ratios. The controlled polymerization process can be initiated by an ATRP initiator comprising mono-functional, difunctional or multifunctional initiating groups and/or species attached to a core particle or can further comprise an AB* molecule. The initiator, or inimer, may optionally comprise a degradable functionality.

The distribution of the stable crosslinks and reversible crosslinks throughout the formed network can further moderate the swelling ratio of the gel particle in its closed, open and re-closed conformation, and hence the ability of the final gel particle to encapsulate added guest molecules, functional compounds, or materials. Selection of divinyl monomers with different reactivity ratios of the "stable" and "reversible" divinyl crosslink agents can be used to adjust the distribution of the "stable" and "reversible" agents along the backbone of the gel network as the polymerization progresses from the residue of the initiator to each the active chain end(s) comprising the gel particle. (see, FIG. 14.)

In one embodiment, the reactivity ratio's of the added (more) stable first divinyl crosslinking monomeric unit and reversibly cleavable second divinyl crosslinking monomeric unit with the backbone (co)monomer(s) can be selected so that when the gel is formed in a controlled polymerization process with a difunctional initiator, the reversibly cleavable divinyl crosslinking monomer is preferentially incorporated into the copolymer and the stable divinyl crosslinking monomer is preferentially incorporated at higher conversions. This would allow a gel particle to be formed wherein cleavage of the reversible crosslinks would allow increased swelling of the gel particle since each chain within the gel particle would remain attached to other chains in the gel at the periphery of the backbone chains while the cleaved functional groups comprising the reversible crosslinks would remain in the local of the other functional groups comprising the reversible crosslinks, thereby increasing the likelihood of mutual reaction with another cleaved functional groups to reform the reversible crosslinks during the "closing" process. This can be envisioned as expansion of a soccer ball or softball to the size of a basketball as the reversible crosslinks are cleaved then reforming a "tighter" network on closing the cleaved functional groups to reform the reversible crosslinks while encapsulating added guest compounds, such as functional compounds to be delivered to a target site. (see, FIG. 13A) In this embodiment the gel network is opened and swelling ratio is increased as the reversibly cleavable crosslinks are cleaved and then the gel polymeric network is then closed as the crosslinks are reformed, thereby encapsulating the added guest compound(s). This concept would also work if the reactivity of both crosslinking agents were similar as the "pore" size, or number of monomer units between "stable" crosslink points, would increase as the degradable links were opened.

As described previously, desired therapeutic agents as guest compounds or functional compounds, may be admixed with, blended with, conjugated to, or, otherwise modified to contain a polymer composition (which may be either biodegradable or non-biodegradable) or a non-polymeric composition in order to release the therapeutic agent over a prolonged period of time. For many of the aforementioned embodiments, localized delivery as well as localized sustained delivery of the agent may be required. For example, a desired therapeutic agent may be admixed with, blended with, conjugated to, or, otherwise modified to contain a polymeric composition (which may be either biodegradable, non-biodegradable or partially biodegradable) or non-polymeric composition in order to release the therapeutic agent over a period of time.

In order to determine the minimal requirements of a dual responsive functional gel, a series of experiments were conducted with low levels of crosslinking agent(s) added to a controlled radical polymerization (CRP) process and it was determined that the level of permanent crosslinking within the gel should exceed 1:1 (crosslinking molecules per polymer chain) to guarantee the synthesis of a gel network instead of a hyperbranched polymer as the polymerization is pushed to 95%+conversion. (FIG. 3) Without wishing to be limited by the explanation, it is believed that an excess of divinyl monomer has to be added since not every pendant vinyl group formed when one vinyl group on the divinyl monomer is incorporated into a growing copolymer chain is incorporated into another growing chain (i.e., not every divinyl monomeric unit forms a crosslink).

In a controlled polymerization process, the ratio between the moles of monomer and total concentration of crosslinking agents determine the mesh size of the gel (average length of polymer chains (or DP) between two crosslinking points) which is one parameter that provides a stable network. When combined with the added reversible network crosslinking agent, this provides information on the size of second functional compound or guest molecule that can be physically encapsulated and retained in the final gel.

In one embodiment of this invention, the first, or stable network can be considerably looser than the target final network in order to cast a wide net when the open gel particle is dispersed in a good solvent for the polymer segments thereby encapsulating the desired added guest component(s) prior to closing the network by joining together the reversible cleavable crosslinks, thereby physically or chemically entrapping the desired guest functional material(s) within the new gel particle which now additionally comprises the desired functional compound. Additional functionality can be incorporated into the backbone copolymer in order to increase the efficiency of incorporation of the added agent with the gel particle by Van der Waal's interactions, [Melander, W.; Horvath, C. *Act. Carbon Adsorption Org. Aqueous Phase* 1980, 1, 65-89] chemical affinity, hydrogen bonding, ionic interactions, hydrophilic interactions, hydrophobic interactions, chemical reactions, and combinations thereof or by conducting a weak chemical reaction between the added functional compound or guest and the gel particle with functional groups present on the polymeric backbone segments or latent crosslinking functionality when the gel is in its open form. However, if a molecule which would lead to branching in the polymer segments, such as happens when an AB* molecule is added, then the overall size of the molecule that can be encapsulate by the network comprising a certain fraction of stable and/or reversible crosslinks can be decreased.

In one embodiment of the invention, the reversibly cleavable crosslinks comprise a disulfide bond as disclosed in patent application PCT/US04/09905. If such a disulfide bond is incorporated into a crosslinking agent present, either as the sole reversible crosslinking agent, or as one of two or more reversible crosslinking agents, then the disulfide group can be used to bind additional added functional compounds to the polymeric backbone of the gel particle. In order to exemplify this concept of creating specific bonding between the added functional compound and the gel, a thiol-containing guest molecule (for example, a fluorescent dye) was designed for incorporation into the gel through a degradable disulfide link. (Exemplified by scheme 5, Example 5) One scheme for reactive incorporation of the small functional compound is shown below, Scheme 3 and further illustrated in FIG. 13B. Other thiol containing molecules such the gamma-Glu-Cys-Gly-OEt (glutathione) or the anti-cancer drug doxorubicin are also added to the first formed gel to further exemplify the interactive enhanced encapsulating ability of a thio-funtionalized gel particle.

Scheme 3. Incorporation of thiol-functional molecules into reversible crosslinked disulfide gel particles via formation of new disulfide bonds.

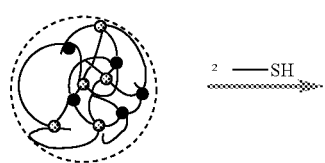

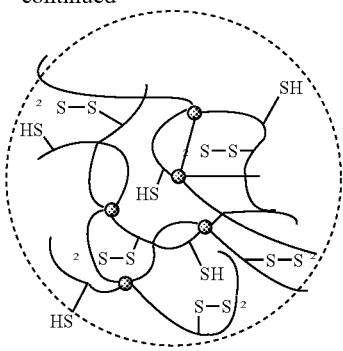

Any guest molecule or functional compound with an available thiol group can be incorporated into the gel particle by reaction with a disulfide link within the gel. In one exemplary example detailed below, a fluorescent dye having a thiol was synthesized since it should be able to react with the reversible crosslink disulfide groups in the gel and its incorporation readily measured. Theoretically, during the reaction, the gel should expand while the guest molecule cleaves the disulfide bond as they are binding to the gels. This "chemical" encapsulation of guest molecules is much more efficient than physical absorption/diffusion because there is a controlled uptake and consequentially a controllable release of a known amount of guest molecules. In a reducing environment, the disulfide group formed between the gel particle and guest molecules can be cleaved so that the guest molecules are delivered thereafter to the target environment. In this embodiment, the guest molecules undergo interactive encapsulation or chemical incorporation into the gel particle through site specific interaction with functional groups within the gel particle thereby providing high uptake efficiency without being affected by the mesh size. Specific binding sites within the gel copolymer are provided to facilitate the interaction. See, FIG. 13B.

Therefore, in a further embodiment, protected-thiol-functionalized (micro)gels and thiol-containing functional linear and star polymers may be synthesized and some additional interaction force (such as ionic interactions or weak chemical bonding) may be introduced to enhance the uptake of organic molecules into the gel. The encapsulated guest molecules could also be released from the gel after the breaking of the encapsulating enhancing force. Introduction of any reversible driving force (such as, for example, hydrogen bonding or disulfide bonding) can keep the guest molecules from leaking out of the gel particle until the bond is broken at the target area and/or at the preprogrammed time. As exemplified below, a thiol-containing functional polymer (guest molecules modeling the size of small and large proteins) can react with a protected-thiol-functionalized gel. Since the thiol group has a high $k_{tr}$, a protected thiol functionality was used during the polymerization. This is exemplified in one of the examples below where a protected-thiol-functionalized ATRP initiator was synthesized first, (Scheme 6 in Example 6), the protected group (benzothiazole) can easily be replaced by another attacking alkyl thiol and form an alkyl disulfide bond.

Disulfides are used herein as exemplary units for formation of biodegradable crosslinks and biodegradable links for attachment of agents since disulfides should degrade in the environment of a cancer tumor site but other degradable units known in the art can also be employed.

In a further embodiment of the process, the capacity of the first formed gel comprising a dual functional crosslink network to entrap/interact with additional molecules can be further enhanced by employing the terminal functionality that was initially present on each added initiator molecule and is now present within the gel particle to form a core shell structure by addition and polymerization of a second set of (co)monomer(s), for example by an ATRP process. In this manner the surface properties of microgels can be easily tuned by chain extension from the chain-end functionalities remaining within the microgels. This can form a shell to enrich the concentration of either hydrophobic guest molecules in a gel prepared by bi-phasic aqueous polymerization processes or hydrophilic guest molecules in gels prepared by inverse emulsion processes. As used herein, the terms "functional agent" or "residue of a functional agent" means the terminal functionality (or residue thereof) within the gel particle. As used herein the term "surface reactive agent" means a compound that may react with a functional agent or residue of a functional agent.

In a further embodiment, the surface of the gel can be functionalized using high yield "click" chemistry as disclosed in PCT/US05/007264.

In a further embodiment, the surface reactive agents attached to the terminal agent can act as blocking agents to provide a physical barrier to retain the guest compound or functional compound within the gel particle. In this embodiment, a combination of cleavable crosslinker, followed by loading and then by attaching polymer through a similar link that degrades at the target site is used in order to temporarily "block" the pores until delivery to the active site is complete.

In a further embodiment, the blocking agent can additionally comprise a water soluble visual imaging agent to let us know the functional nanoparticle has found a tumor.

For example, in one embodiment of the gel particle, the residue of the at least one functional agent may form a chemical bond with a surface reactive agent, such as a reactive monomer, a reactive monomer, a reactive oligomer, and combinations of any thereof. According to these embodiments, the gel particle further comprises a polymeric shell bonded to at least a portion of the surface of the particle, wherein the polymeric shell may alter the surface properties of the gel particle. For example, according to one embodiment, the polymeric shell may seal one or more pores on the surface of the gel particle and further encapsulate the chemically or physically encapsulated compound and wherein the polymeric shell is bonded to the surface of the gel particle by a degradable bond.

In another embodiment, the surface reactive agent may be a functional macromolecule such as a bioresponsive molecule, for example, a receptor or ligand for a receptor, an antibody, an oligosaccharide, or a recognition element. The bioresponsive molecule may enhance at least one surface property of the surface of the gel particle, for example, allowing the gel particle to bind to specific targets, such as target cells, or allow transportation of the gel particle into specific target environments.

In a non-limiting initial step toward demonstrating such utility for biological and biomedical applications, we herein report our results on applicability of nanogels as carriers for controlled drug delivery scaffolds to target specific cells.

Stable nanogels were prepared using inverse miniemulsion ATRP and examined their cytotoxicity to C2C12 mouse myoblast cells. The biodegradation of nanogels crosslinked with degradable disulfide bonds in the presence of the tripeptide glutathione as a biocompatible reducing agent were studied. The nanogels were loaded with a fluorescent dye and Doxorubicin and examined the in vitro release of these functional molecules from the nanogels to demonstrate that glutathione induced degradation triggers the controllable release of encapsulated molecules. In addition, bioavailability, or tailoring a bio-responsive surface on the nanogels was demonstrated by conjugation with biotin which in turn binds to avidin resulting in the formation of avidin-nanogel bioconjugate gel particles.

Therefore, in this single non-limiting exemplification of one embodiment of this invention, a functional gel particle with a functional crosslinked network is designed to have specific molecular composition and architecture which results in incorporation of the following functions and specifications into a single designed molecule:
  i) biocompatibility,
  ii) control over the molecular weight of the degradation products (lower than the renal threshold),
  iii) delivery to the targeted tumor site,
  iv) degradation triggered by the presence of cancer cells,
  v) controlled rate of release of encapsulated drug, and
  vi) evidence of the sustained activity of the encapsulated drug.

In a further embodiment of the process, the reversible nature of a fraction of crosslinks in the system can be utilized to form a self healing polymer matrix. The reversible crosslinks fracture during stress and reform, though not necessarily with the same functional groups forming the first crosslink, to provide a similar network to that present prior to the application of stress.

Other embodiments of the present disclosure relate to processes for preparing a gel particle, such as those gel particles described herein. In one embodiment, the process may comprise polymerizing by a controlled polymerization process, such as a controlled radical polymerization process, for example ATRP, in a biphasic media a polymerization system and forming a polymeric network comprising chemically stable crosslinks and cleavable crosslinks. The polymerization system according to these embodiments comprises vinyl monomeric units; at least one first divinyl monomeric unit, wherein the vinyl groups are connected by a chemically stable linking group; and at least one second divinyl monomeric unit, wherein the vinyl groups are connected by a cleavable linking group. According to specific embodiments, the biphasic media may comprise a continuous aqueous phase or a continuous non-aqueous phase. The continuous non-aqueous phase may be an organic phase, an ionic liquid phase, or a supercritical fluid phase. In those embodiments the biphasic polymerizing may comprise a microemulsion polymerization process, a miniemulsion polymerization process, an emulsion polymerization process, or a suspension polymerization process.

In certain embodiments of the process for preparing the gel particles, the process may further comprise encapsulating a functional compound within the gel particle during the polymerization process. The functional compound may comprise any of the functional compounds or guest compounds described herein or known in the art.

In other embodiments of the process for preparing the gel particles, the cleavable crosslinks are reversibly cleavable crosslinks and the process may further comprise cleaving at least a portion of the reversibly cleavable crosslinks to increase a swelling ratio of the gel particle, adding a functional compound, wherein the functional compound migrates or diffuses into an interior portion of the swelled gel particle, and reforming at least a portion of the reversibly cleaved crosslinks to decrease the swelling ratio of the gel particle to encapsulate the functional compound. In specific embodiments, the functional compound may form a chemical bond with the polymeric backbone of the gel particle, for example, by forming a chemical bond with a residue of the reversibly cleaved crosslink.

Still other embodiments of the process for preparing the gel particles may further comprise attaching one or more surface reactive agents to at least a portion of an outer surface of the gel particle. The surface reactive agent may form a chemical bond with a functional agent or residue of a functional agent on at least a portion of the outer surface of the gel particle.

Further embodiments of the present disclosure relate to a process for delivering an active compound, such as the guest molecules or functional compounds described herein, to a target site. The process comprises forming a gel particle comprising a polymeric network comprising chemically stable crosslinks and cleavable crosslinks by a controlled polymerization process, such as an ATRP or controlled radical polymerization process, encapsulating one or more active compounds in an interior portion of the gel particle, delivering the gel particle to a target site, cleaving at least a portion of the cleavable crosslinks of the polymeric network, and increasing a swelling ratio of the gel particle such that the one or more active compounds is released from the interior portion of the gel particle at the active site. The process may further comprise degrading at least a portion of the chemically stable crosslinks over a time period ranging from 7 days to 30 days or more, to form polymer fragments having a size and/or molecular weight below the renal threshold. In other embodiments, the process may further comprise attaching at least one surface reactive agent to at least a portion of a surface of the gel particle. According to these embodiments, the surface reactive agent may form a bond with a functional agent or residue of a functional agent on a surface of the gel particle. The surface reactive agent may alter at least one surface property of the gel particle.

EXAMPLES AND DISCUSSION OF EXAMPLES

The invention is illustrated but not limited by the following examples, including examples describing the applicability of nanogels to biomedical applications as targeted drug delivery carriers exemplified by loading of fluorescent dyes and anticancer drugs into nanogels, biodegradation of the loaded nanogels in the presence of biocompatible reducing agents and bioconjugation to agents targeting overexpressed receptors in cancer cells.

Example 1

Comparison of Gels Prepared by Free Radical Polymerization (FRP) and ATRP

As noted herein, gels are usually prepared by a standard free radical polymerization because of the ease of conducting the process. However, if a gel with an ordered internal microstructure is desired a gel prepared by FRP cannot meet the requirement since in a free radical co-polymerization (FRco-P) comprising a molar excess of crosslink agents, a gel is formed at very low conversion of monomers to polymer since high molecular weight polymer is formed at low conversion. Furthermore, the composition of gel particles can change as conversion increases if the reactivity of the monomer and crosslink agent differ. Gels from CRP processes, such as ATRP, should exhibit a more ordered network with evenly distributed mesh size, i.e. degree of polymerization (DP) between crosslink sites can be controlled, since each and every chain is growing at close to the same rate and the gel is formed at higher conversions of monomer to copolymer. (See FIG. 14.)

This is demonstrated herein by comparing the swelling behavior of a gel prepared by a CRP with a gel prepared by FRP with the same ratio of monomer:crosslink agent. Two polymerizations were carried out forming gels by a FRP and by ATRP, respectively. An examination of FIG. 12 shows the expected difference in swelling behavior. The gel prepared by a controlled polymerization process swells to a much greater degree as a consequence of the more regular structure of the gel.

In the following series of examples, the run numbers used by the inventor to identify the run in the laboratory notebook are retained, but do not have any relevance other than provide identification of each experiment.

Run KM 668: Mole ratio of reagents: MMA:EGDMA: AIBN=400:20:0.625

Run KM 668, conducted as a FRP, led to formation of a gel after ~5 minutes. The polymerization was soon stopped by lowering the temperature. The gel was swollen in THF and the conversion was measured to be ~22%. The gel was washed several times with THF to remove the remaining monomer/initiator.

Run KM 669: Mole ratio of reagents: MMA:EGDMA:EBiB: CuBr/dNbpy=400:20:1:0.25

KM 669, a living/controlled ATRP, ended up forming a gel after ~240 minutes. The polymerization was stopped by exposing the catalyst complex to air and lowering the temperature. The gel was swollen in THF and the conversion was measured to be ~25%. The gel was washed several times to remove the remaining monomer/catalysts.

The gels from both the FRP and ATRP were dried in a vacuum oven for ~1 week then 0.52 g of each gel was immersed in 10 mL toluene for 24 hours. The gel was carefully removed from the solvent and weighed. The swollen gel from the FRP weighed 1.084 g; while the swollen gel from the ATRP weighed 5.077 g; demonstrating the dramatic difference in swelling ratio between the gels from FRP and ATRP. (FIG. 12) The gels from the ATRP exhibited a much higher swelling ratio compared with the gel from the FRP, proving that a more ordered structure does change the swell-ability of the copolymer.

The efficiency of encapsulation of guest molecules, and efficiency of releasing the encapsulated material from the gels prepared by FRP and ATRP is shown to be very different. In this example the targeted DP of the polymer backbone prepared by ATRP was 400 but the ratio of monomer to added crosslinker provided an average DP between crosslinks=40.

Example 2

Micro-Particles Comprising a Double-Crosslinked Network

Microparticles were prepared by ATRP in a miniemulsion system with different ratios of permanent crosslinkers and degradable crosslinkers. The interesting characteristics about the double-crosslinking system, is that it can predictably open and close the polymeric network upon exposure to different redox environments. As a consequence of the addition/incorporation of a molar excess of permanent crosslinking agent the gel particle retains a gel structure even after opening the reversible crosslinks.

2A. First trial example: RUN KM 671, MMA:EBiB:EGDMA:SS:Cu(II) $Br_2$:Ascorbic acid=200:1:5:5:0.4:0.12, (SS=bis(2-methacryloyloxyethyl) disulfide).

[Ratio of initiator to stable crosslinker to cleavable crosslinker is 1:5:5 with targeted DP between crosslinks equal to 10, at 100% conversion.]

The miniemulsion polymerization led to formation of a microgel with a particle size of 163 nm. The microparticles were washed with methanol to remove the surfactant, and were then dispersed in THF. The particles exhibited a size of 173 nm in THF. However, upon the addition of tributylphosphine, the particles didn't show a significant difference in size. This means the stable crosslink density was too high for this double-crosslinking system to show a change in swelling ratio, especially since on average there was five stable crosslinking agents per polymer chain, meaning all of the chains remain tightly bonded to each other. Even when the disulfide bonds are cleaved the gel cannot swell to a significantly greater extent in THF. Note however, that this does not mean that the degradable links did not open, only that the opening did not increase the swelling ratio. The available thiol units could be used to bind suitable drugs to the network.

2B. Examination of the amount of crosslinking agent required for formation of a responsive gel. In order to find the lowest amount of the (stable) crosslinking agent to reliably form a solid gel, two polymerizations were carried out in a bulk reaction:

KM 677: MMA:EBiB:EGDMA:CuBr/dNbpy=200:1:2:0.25
KM 678: MMA:EBiB:EGDMA:CuBr/dNbpy=200:1:1:0.25

Run KM 677, with more crosslinking agent, resulted in formation of a gel after 9 hours. Run KM 678 could not be fully stirred after 9 hours, but it did not form a complete gel until 20 hours, with air bubbles trapped inside. The kinetic plots (as examined by monomer conversion of methyl methacrylate (MMA)) of the two polymerizations were very similar to each other (as shown in FIG. 4). However, run KM 677 formed a solid gel system that could not be dissolved in THF. In contrast, the gel formed in run KM 678 when swollen in THF slowly decomposed. The "gel" finally completely dissolved in THF and was be easily filtered through a 220 nm filter. The molecular weight was measured, (FIG. 3), which showed that the "gel" was actually a hyperbranched system. The formation of hyperbranched polymer demonstrated that a 1:1 ratio of crosslinker:intiator is not enough to form a solid gel system in a CRP, despite the concept that 1 crosslinker per chain should be enough for formation of a gel at 100% conversion. The reason is that it is very difficult to force each vinyl unit in each and every crosslinker molecule to participate in copolymerization/crosslinking reactions. When one of the vinyl groups is incorporated into the growing chain, the other vinyl group remains dangling on the side chain of the polymer backbone and the reactivity of the vinyl group has been decreased as a consequence of chemical and physical interactions. Therefore, in order to guarantee a fully stable crosslinked system, slightly more crosslinker (i e more than a 1:1 ratio of crosslinker/initiator) has to be used in the system. If 99% of the available vinyl groups are incorporated into the gel, then greater than 1:1.01 ratio, and preferably greater that 1:1.02 ratio, of crosslinker to initiator should provide a stable gel.

2C. Formation of double crosslinked microparticle: Run KM 679: MMA:EBiB:EGDMA:SS:Cu(II) $Br_2$:Ascorbic acid=200:1:1:0.3:0.12.

This polymerization was conducted in a miniemulsion polymerization system and resulted in the formation of a solid gel after 4 hours. The monomer conversion was ~100%. The microgel from the miniemulsion polymerization exhibited a particle size of 165 nm. After washing with methanol (to remove the surfactant), the particles were dispersed in THF (0.25 g in 10 mL THF) and the size was measured to be 204 nm.

Tributylphosphine (TBP, 50 μL) was added to 1 mL of the particle dispersion and the change of particle size was tracked by periodic measurement in a particle sizer. As shown in FIG. 5, the particle size quickly increased to ~250 nm and reached a plateau after that. This means the volume of each particle increased by 1.84 times as the cleavable links were cleaved.

The above procedure has demonstrated that this crosslinking system comprising a cleavable crosslinking agent can be "opened" by exposing the particle to a reducing atmosphere. The next step demonstrates that the network can also be closed, if desired. In order to remove the remaining tributylphosphine and to oxidize the thiol groups, THF was removed from the particle dispersion. The dried particles were washed by suspending in methanol several times. The final particles were re-dispersed in THF and measured by a particle sizer for size analysis. Presumably, if there is a random distribution of stable and reversibly cleaved crosslinks after all of the thiol groups are cleaved, the particle size should be fixed even after the thiol groups are re-connected to each other. The thiol group has no memory of the other thiol functionality which was bonded with it, and thus it can only react with another thiol group within its shortest reachable distance. Therefore, after cleavage, the particle size should be very similar to the biggest size that was detected as was seen for the particle with a random distribution of permanent and reversible crosslinks. However, the ability of an encapsulated agent to diffuse out of the gel has been reduced by formation of additional crosslinks thereby reducing the mesh size of the gel.

Example 3

Synthesis of Microgels with Various DP Between Crosslinks (Mesh Sizes) and Star Encapsulation In gel synthesis and further applications based on utilization of the gel particle as a carrier material, the mesh size of the gel (average length of polymer chains (or DP) between two crosslinking points) is a parameter that should be considered in order to provide stable encapsulation of the encapsulated agent. In ATRP, this parameter is controlled by the targeted degree of polymerization, (ratio of monomer to initiator) (DP) and crosslinker (DP/X). In the following series of examples, the stable crosslinking level is held a constant (1.2 per crosslinking molecules per chain) and the DP of the backbone chains between the cleavable crosslinks are varied.

The following ratios of reagents were used for the initial two runs under standard ARGET ATRP conditions. [see, Patent Application PCT/US06/33792]
Run KM 687 MMA: EBiB:EGDMA:—SS—:Cu(II):Ascorbic acid=300:1:1.2:1:0.3:0.12
Run KM 689 MMA: EBiB:EGDMA:—SS—:Cu(II):Ascorbic acid=400:1:1.2:1:0.3:0.12

The ability of a loosely crosslinked gel to encapsulate a large complex molecule was initially exemplified by encapsulation of a multi-arm star macromolecule into a preformed gel. The size of star was measured by dynamic light scattering. Two peaks were observed; one with particle diameter ~16 nm and the other ~130 nm. The larger peak was considered to be formed by aggregation of the smaller star macromolecules. The gel particles were mixed with stars and the various steps of the process are listed in Table 1 below and illustrated schematically in Scheme 4.

TABLE 1

Various conditions examined in Run KM 696 to show encapsulation

| Gel | Sample | First Step | | Second Step |
|---|---|---|---|---|
| KM 687 DP = 300 | A | 50 hours with polyBA star without TBP | | |
| | B | 50 hours with polyBA star with 50 uL TBP | KM 696 B1 | Continue in reducing environment |
| | | | KM 696 B2 | Oxidized for 20 hours |
| KM 689 DP = 400 | C | 50 hours with polyBA star without TBP | | |
| | D | 50 hours with polyBA star with 50 uL TBP | KM 696 D1 | Continue in reducing environment |
| | | | KM 696 D2 | Oxidized for 20 hours |

During the first step, each gel was mixed with the polyBA stars with or without the reducing agent. The purpose of such comparison was to show that without the action of the added reducing agent, it would be more difficult for the stars to move or diffuse inside the microgels and be encapsulated by the gel. This was exactly what happened. During the dynamic light scattering measurement after Step 1, both B and D showed a single peak (440 nm and 515 nm, respectively), indicating that the gel particles had been "opened" by cleavage of the disulfide links and that all of the star molecules were already encapsulated within the microgel.

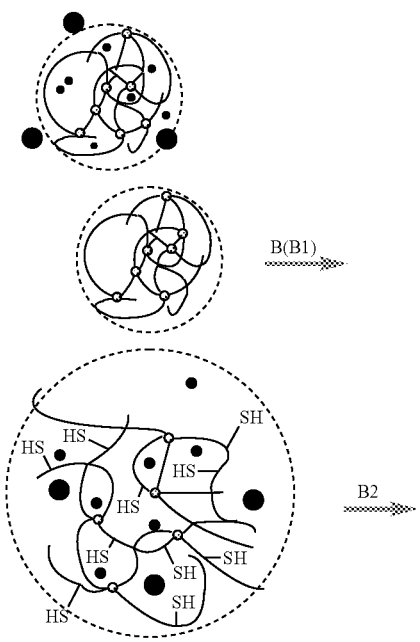

Scheme 4. Stepwise "opening," encapsulation and "closing" of a dual responsive gel microparticle.

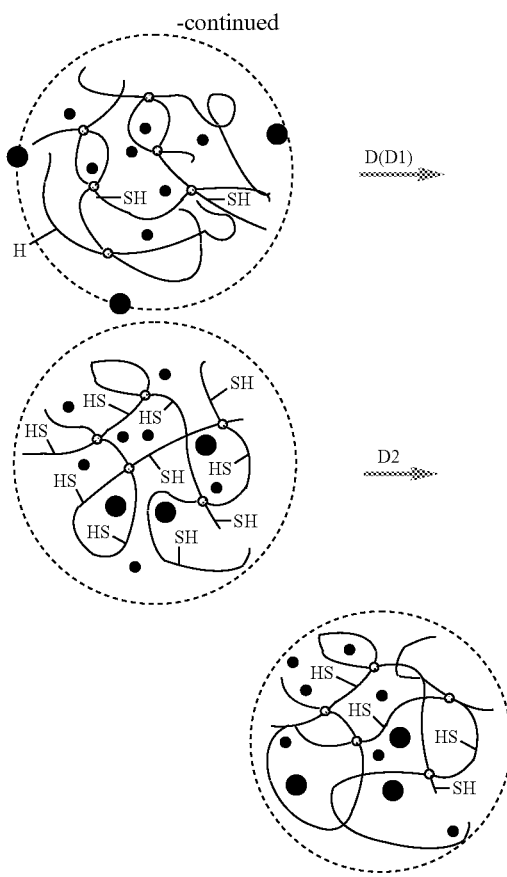

In contrast, both A and C showed two peaks. A had two peaks at 102 nm and 310 nm, while C had two peaks at 143 nm and 425 nm. This means, the small stars had diffused into the microgel cavities, even without cleavage of the disulfide linkages, but the relatively large star aggregations could not diffuse into the gel system. It is worth noting that during this step the DP of the gels was not affecting the results, because the segment length between crosslinks, when targeting DP's 300 and 400, are both long enough to allow for encapsulating 20 nm stars and even ~120 nm star aggregations.

During Step 2, samples B and D were split into two parts. One part was retained in the reducing environment, while the other part was subject to oxidation. This step was designed to show that after oxidation and the resulting sealing, or "closing" of the system, by reforming disulfide linkages would help anchor/stably encapsulate the stars inside the gel cavities. In this step, different DP of the targeted or envisioned backbone of the gel showed different results. According to DLS measurement, the DP 300 gel (B2) showed two peaks after oxidation (150 and 420 nm), indicating the already encapsulated star-aggregations diffused out of the microgel during the oxidation process. Considering B1 still showed a single peak at 440 nm, a possible explanation for the two peaks seen in sample B2 could be that because of the shrinkage of the gel during the oxidation process, the relatively big star-aggregations were squeezed out of the microgel. With a higher DP of 400, gels showed better encapsulation capacity, reflected by the single DLS peak of sample D2 (430 nm). D1 still showed single peak at 510 nm. The difference between D1 and D2 indicates the microgel system shrank after oxidation. But because of the relatively large mesh size, the large star-aggregation was still stable inside the gel formed with a target backbone DP of 400.

In short, when the average DP of the backbone copolymer is high, e.g. 300, small individual star molecules can be encapsulated in the gels; however, aggregated star macromolecules, diameter of the stars +120 nm, can only diffuse into the cleaved gel system, and can diffuse out of the gel 1) as the disulfide linkage is sealed again and/or 2) if the mesh size is not small enough to retain the aggregates in the system. The schematic may lead one to think the stars (at least the small ones) were stably encapsulated by enthalpy in the microgel system. However, this is not necessarily true: this encapsulation could be considered to be unstable because there was no specific bonding existing between host (gels) and guest (stars), the guest can diffuse out of the gels during the post-encapsulation isolation/transportation processes since only chemical affinity, Van der Waal's forces, retained the materials within these loose networks. However, chemical affinity can provide a stable transportable particle, e.g. after centrifugation, the supernatant was analyzed by DLS. In each case, the supernatant showed the same peaks (position and distribution) as the original stars.

Example 4

Modification of Microgel-Surface Properties

ATRP of aqueous dispersed media can be used to prepare hydrophobic microgel particles with potential for post fabrication property manipulation. One of the primary advantages of ATRP is the maintenance of functional groups arising from the transferable atom or group that remain inside the microgel and are accessible to monomer units or other small molecule chemistry including chemical modification for targeted encapsulation of functional drug/bio-active molecules. Therefore, in one embodiment of the invention, these chain-end functionalities can either be chain extended by polymerizing other monomers or oligomers and these second dangling polymer chains can significantly change the surface property of the microgel or, in another embodiment of the invention, the functionality can be used to attach a surface reactive or modifying functionality or bio-response molecule or agent to the surface of the first gel. This is exemplified below by reacting the terminal halide groups with biotin using a carbodiimide coupling reaction in water.

In order to prove this concept, a PMMA microgel was prepared. The polymerization was stopped at monomer conversion ~50%.

| KM 718 | | KM 717 | |
|---|---|---|---|
| PMMA | 0.02 g | PMMA | 0.02 g |
| HEMA | 6 mL | DMAEMA | 6 mL |
| CuCl | 0.0074 g | CuCl | 0.0053 g |
| CuCl2 | 0.0011 g | CuCl2 | 0.0008 g |
| bpy | 0.0258 g | bpy | 0.0185 g |
| acetone | 0.2 mL | acetone | 0.2 mL |
| Temp | 35° C. | Temp | 35° C. |
| Reaction Time | 24 h | Reaction Time | 24 h |

After the reactions were stopped each mixture was subjected to centrifugation to separate the microgel from the solvent. The microgel with polyHEMA at the surface (presumably) was easily dispersed in methanol. The microgel with polyDMAEMA was easily dispersed in acidic water solution. These results indicate a successful chain extension from the chain-end functionality that remained in the PMMA microgel during the first miniemulsion ATRP and confirm the formation of a hydrophilic shell on the first formed hydrophobic gel that allows dispersion in a more polar medium.

Example 5

Fluorescent Dye Synthesis and Incorporation of Functional Material into Gel Particles In order to exemplify formation of a weak or chemically reversible chemical bond, i.e create specific bonding between the chemical species that is to be encapsulated and the gel, a thiol-containing fluorescent dye guest molecule was designed and constructed using the following procedures.

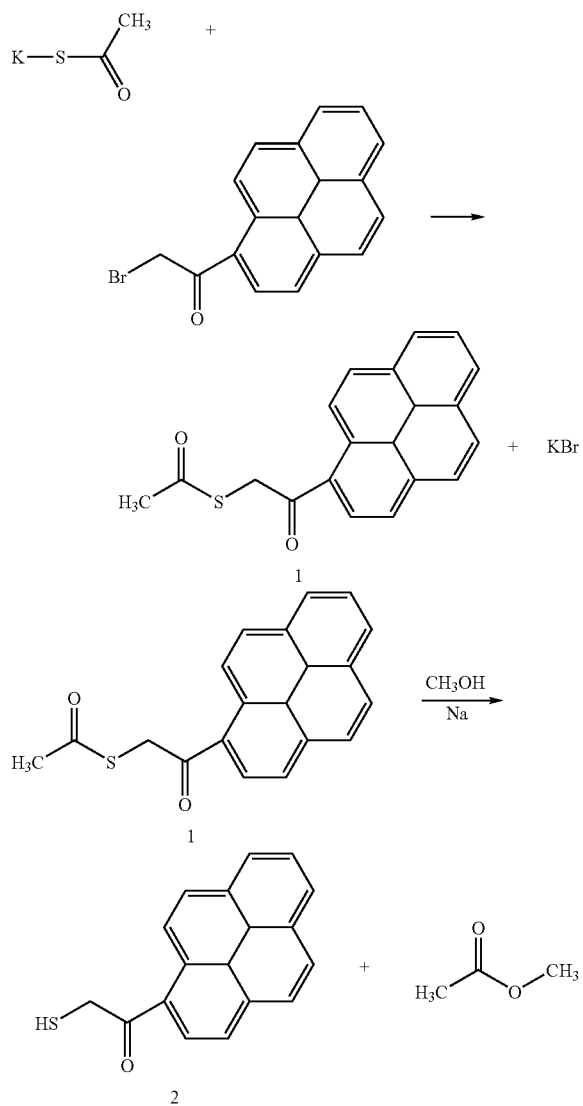

Scheme 5. Procedure for preparation of a reactive fluorescent dye.

Formation of 1: 0.2230 g potassium thioacetate was mixed with 0.4120 g bromomethylacetyl pyrene in 10 mL DMF. The mixture was stirred at 60° C. overnight (12 h) and cooled to room temperature. The mixture was then poured to 60 mL of cold water. A yellow precipitate was observed and was filtered off. The organic part was extracted three times with 40 mL ethyl acetate. The collected organic solutions were combined and dried over $Na_2SO_4$ before being concentrated by rotary evaporator. The crude product was a dark brown solid. It was re-crystallized from methanol and brown-red powder was obtained. (0.2485 g, yield: 62%) $^1$H NMR was used to confirm the purity of the product.

Formation of 2: 0.2 g sodium was dissolved in 10 mL methanol at room temperature while nitrogen was bubbling through the liquid. 0.16 g of 1 was added to the solution and the mixture stirred under nitrogen overnight (12 h). Glacial acetic acid was added drop by drop to the solution to acidify the system and then the mixture was poured into 20 mL cold water. The mixture was filtered and dried in vacuum. A brownish powder, 2, was obtained. (0.06 g, yield: 42%) The product was not further purified before use.

Compound 2 was then mixed with 0.025 g of gel particles KM 687 in THF for 2 days. After five cycles of centrifugation—redispersion in THF, the supernatant was analyzed by UV-Vis measurement and no obvious peak was detected, meaning all free dyes molecules had been removed from the system. The solid gel sample was still a light yellow color, indicating there were fluorescent molecules inside the microgel particle.

Example 6

Synthesis of Gel Containing Benzothiazol Disulfide Groups and Incorporation of Thiol-Functionalized Polymers In the above examples, a concentration effect was employed to drive guest molecule into microgels, but the efficiency of this process is expected to be low and the encapsulated guest molecules may possibly be released from gel at any time the environment outside the gel changes to favor elution. Introduction of any reversible driving force (such as hydrogen bonding or disulfide bonding) can keep the guest molecules from "leaking" out of the gel particle until the bond is broken at the target area or at the preprogrammed time. In this example, a thiol-containing functional polymer as the guest (a guest molecule modeling the size of proteins) is designed to react with a protected-thiol-functionalized gel. Since the thiol group has a high $k_{tr}$, a protected thiol functionality was used during the polymerization.

A benzothiazol disulfide molecule containing an ATRP initiator functionality was synthesized using the approach shown in Scheme 6. The protected group (benzothiazole) is designed to be easily replaced by another attacking alkyl thiol and form alkyl disulfide bond. This was exemplified by fast reaction of the synthesized initiator 2-mecaptaethanol at room temperature. The success of the reaction was evidenced by NMR spectrum (see, FIG. 6).

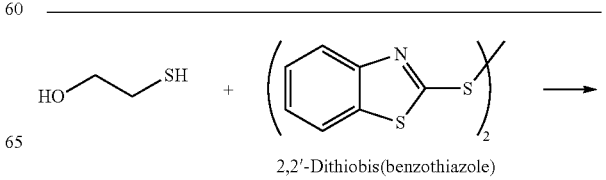

Scheme 6. Synthesis of benzothiazole disulfide ethyl 2-bromoisobutyrate (B-SS-Br) ATRP initiator.

2,2'-Dithiobis(benzothiazole)

-continued

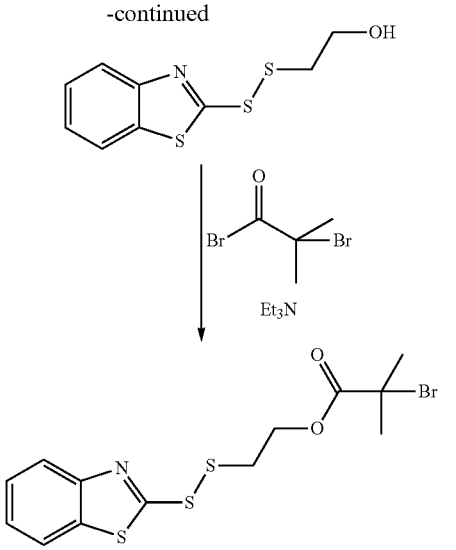

It was found that this initiator is sensitive to heat since at 60° C. any attempt to conduct a polymerization resulted in formation of a white precipitate and no conversion was observed. Nevertheless ATRP of HEMA and MMA with this initiator was successfully performed at room temperature (—30° C.).

Synthesis of polyHEMA-Br linear polymer. The ratio of reagents employed in the reaction and reaction conditions were:
[HEMA] (4 mL):[B—SS—Br]:[CuBr]:[CuBr$_2$]:[bpy]=100: 1:0.45:0.05:1 in MeOH (0.8 mL)/MEK (1.2 mL) at 30° C. After 1.25 hours the reaction was terminated and the polymer had M$_n$=18k and PDI 1.42.

In order to provide a simple route for analysis of the tethered polymers to the gel under fluorescent microscopy fluorescein methacrylate (F-MA) was used as a comonomer in a copolymerization with HEMA Synthesis of polyHEMA-Br linear polymer with fluorescein methacrylate (F-MA) as functional comonomer. The ratio of reagents employed in the reaction and reaction conditions were:
[HEMA] (2 mL):[F-MA] (0.135 g):[B—SS—Br]:[CuBr]: [CuBr$_2$]:[bpy]=98:2:1:0.45:0.05:1, in MeOH (0.6 mL)+ MEK (0.9 mL)+DMF (0.5 mL) at 30° C.
After 5.83 hours the reaction was terminated and the polymer had M$_n$=12k and PDI 1.5

The functional linear polymers were introduced into the gel and the enhanced uptake effect measured. These polymers can be reduced to form polymers with one terminus containing a thiol-functionality, which is a model of a functionalized guest molecule. The protected thiol group in the guest molecule was first deprotected by Bu$_3$P reduction. The unprotected thiol group is stable under air for several days, which has been proved by the stability of 2-mecaptoethanol under air. In order to make a model for controlled uptake and delivery of guest molecules, a weak disulfide bond should be incorporated in the gel. In this way, a thiol-containing molecule can easily cleave the disulfide crosslinks within the gel and then be bonded to the gel by formation of a new disulfide bond thereby enhancing the uptake of the polymers into the gel. The encapsulated guest molecules could also be released from the gel after the breaking of the weak bond by presence of a reducing environment at the target delivery site. Therefore, gels containing the benzothiazol disulfide groups were prepared from MMA and HEMA (under the same polymerization condition as those used for ATRP of linear polymers). These thiol-functionalized polymers will be added to a suspension of the gel particles, stirred for a period of time, centrifuged and washed. The gel particles now comprising tethered linear polymer chains will then be exposed to a reducing agent and the gel particles centrifuged leaving a solution of the linear polymers. This procedure will validate the concept that a thiol-containing molecule can easily cleave the gel and then be bonded to the gel, thereby enhancing the uptake of the polymers into the gel. The encapsulated guest molecules could also be released from the gel after the breaking of the weak bond by presence of a reducing environment at the target delivery site.

Example 7

Preparation of Hydrophilic Nanogels in the Presence of Double Crosslinkers

A water-soluble dimethacrylate stable crosslinker (DMA-PEO) was synthesized using a carbodiimide coupling reaction of poly(ethylene glycol) (PEG with M=4,600 g/mol) with methacrylic acid (MAA) in the presence of DCC and DMAP in methylene chloride.

7A. MAA (0.28 g, 3.56 mmol) was added to a solution of PEG (6.8 g, 1.47 mmol), DCC (0.6 g, 3.56 mmol), and a catalytic amount of DMAP in an ice bath at 0° C. The resulting mixture was allowed to stir at room temperature overnight. The formed solids were removed by vacuum filtration and solvents were removed. The solids were dissolved in water and undissolved solids (probably residual DMAP and dicyclohexyl urea by-product) were removed, and the products were extracted from methylene chloride, isolated by evaporation, and dried in a vacuum oven.

Synthesis of stable crosslinkers with different molecular weights. Similarly, DCC coupling reaction was used to synthesize various DMA-PEO crosslinkers with different molecular weights (MW=2,000 and 1,000). Their structures were confirmed by NMR.

7B. A series of inverse miniemulsion AGET ATRP's were conducted by varying the amount of DMA-PEO from 1/1 to 4/1 as the ratio of [DMA-PEO]$_0$/[PEO2000-Br initiator]$_0$. A standard recipe was used in all the reactions: [OEOMA300]$_0$/[PEO2000-Br]$_0$/[CuBr2-TPMA]$_0$/[Ascorbic acid]$_0$=300/1/ 0.5/0.45. For [DMA-PEO]$_0$/[PEO2000-Br initiator]$_0$=1/1, samples taken from reaction mixture appeared to be soluble in THF. From GPC measurements, conversion was around 40%, which was constant after one hour until 1 day. This is relatively low, compared to runs without DMA-PEO crosslinker (conversion>70%). In addition, a large shoulder at higher molecular weight region was observed, which indicates the formation of branched polymers due to the presence of crosslinkers. Unreacted DMA-PEO crosslinker was also observed. Therefore, the ratio of [DMA-PEO]$_0$/[PEO2000-Br initiator]$_0$ was increased to 2/1 and further to 3/1 and 4/1. The sizes of particles dispersed in cyclohexane were around 140-170 nm in diameter with a monomodal distribution. The polymer samples dried at room temperature did not appear to be able to be dissolved in THF and filtered with 0.2 μm PFFE filter, indicating that particles were crosslinked during polymerization in the presence of larger amounts of DMA-PEO crosslinker. These particles were precipitated in THF, aliquots of the precipitates were mixed in THF, and the mixtures were analyzed by DLS. When [DMA-PEO]$_0$/[PEO2000-Br initiator]$_0$=4/1, the size of particles was 156 nm in diameter dispersed in cyclohexane. After precipitation into THF and then redispersion in THF, the size was 280 nm with monomodal distribution, indicating that crosslinked particles remained intact as individual particles in THF. The increase in the diameter of the crosslinked particle from 156 nm to 280 nm was caused by their swelling in THF.

Example 8

Open-Close Experiments for Doubly-Crosslinked Nanogels

Introduction of degradable crosslinker. To demonstrate the feasibility of open-close behavior of hydrophilic nanogels, a degradable crosslinker (DMA-SS, 1.35 mol %) was introduced to inverse miniemulsion polymerization with $[DMA-SS]_0/[DMA]_0/[I]_0=4/4/1$.

Nanogels were prepared as in Example 7 and the size of nanogels when swollen in THF was 242 nm. In the presence of tributyl phosphine, which opens the disulfide crosslink, the size increased to 306 nm with monomodal distribution. Then, the degraded, or opened, gels were purified to remove tributyl phosphine. Oxidation of the thiol functionality to disulfide in the nanogels in air was conducted and size measured at 286 nm.

Example 9

Biodegradable Nanogels as Potential Drug Delivery Carriers: Synthesis, Bio-Conjugation, Bio-Degradation, and In Vitro Release of Encapsulated Drugs Oligo(ethylene oxide) monomethyl ether methacrylate with M=300 g/mol and pendent EO units DP≈5 (OEOMA, Aldrich) was purified by passing it through a column filled with basic alumina to remove inhibitor. Copper(II) bromide ($CuBr_2$, 99%), L-ascorbic acid (AscA, 99+%), and phosphate buffer solution (PBS, pH=7.4) from Acros, sorbitan monooleate (Span 80), cyclohexane (HPLC grade), and rhodamine 6G (R6G) from Aldrich, and glutathione ethyl ester (γ-Glu-Cys-Gly-OEt, reduced form), d-biotin (99%), doxorubicin hydrochloride (Dox), avidin, and fluorescein isothiocyanate-labeled avidin (FITC-avidin, contained 2-4 moles fluorescein isothiocyanate per avidin molecule) from Sigma were used as received. Tris[(2-pyridyl)methyl]amine (TPMA) was prepared according to literature procedures. A disulfide-functionalized crosslinker, dithiopropionyl poly(ethylene glycol) dimethacrylate (DMA) (Scheme 7), and a water-soluble poly(ethylene oxide) (PEO)-functionalized bromoisobutyrate (PEO2000-Br, pendent EO units DP≈45) were synthesized and purified.

While the DP of the PEO units in DMA formed in scheme 7 is ten, more or less units could be present in any designed oligo-polymeric crosslinking agent.

Scheme 7. A synthetic route to dithiopropionyl poly(ethylene glycol) dimethacrylate (DMA).

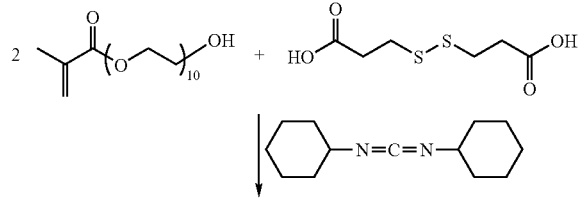

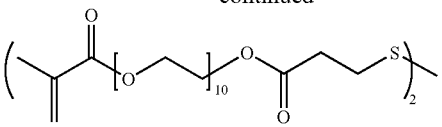

DMA

C2C12 mouse myoblast cells were purchased from ATCC (number CRL-1772). Dulbecco's Modified Eagle Medium (DMEM) was obtained from Invitrogen/Gibco (11995-065). The LIVE/DEAD Viability/Cytotoxicity Assay Kit (Molecular Probes, L-3224) and the CyQUANT Cell Proliferation Assay Kit (Molecular Probes, Invitrogen, C-7026) were used as recommended by the company. Unless otherwise noted, all chemicals and reagents were obtained from commercial sources and used as received.

Avidin/HABA binding assay. A stock solution consisting of Avidin (5.3 mg), HABA (2.1 mg), and PBS (2 mL) was prepared. An aliquot of the stock solution (3 mL) diluted with PBS (2 mL) was mixed with biotin-conjugated nanogels (4.5 mg) and the resulting mixture was stirred for 12 h. The UV-vis spectra of the solution before and after the addition of biotin-nanogels were measured.

Optical Fluorescence Microscopy measurements. Total Internal Reflection Microscopy was used to take the fluorescence images. A 488 nm laser beam from an argon-ion laser (Beam-Lok 2060, Spectra-Physics) is passed through various optics to an Olympus PlanApo 60X oil immersion objective (N.A.=1.45) mounted on an inverted IX-71 Olympus microscope. The Cool Snap HQ CCD camera mounted to the left port of the microscope was used for imaging at 500 ms exposure time. The laser power was measured at 1 mW, prior to passage through the objective, and a 515 nm long pass and 540/50 nm bandpass filter were used to filter scattered light.

Determination of extinction coefficient of Dox in PBS buffer. A series of aqueous solutions of Dox at different micromolar concentrations ranging from 21.2 to 77.5 μM was prepared and their UV spectra were measured (FIG. 7a). Their absorbance at 497 nm was plotted vs. concentration. From the linear fit, the extinction coefficient of Dox was determined to be $\epsilon=7,600$ $M^{-1}$ $cm^{-1}$ in PBS (FIG. 7b).

Preparation, characterization, and purification of crosslinked P(OEOMA) nanogels. AGET ATRP of OEOMA in cyclohexane inverse miniemulsion was utilized for the synthesis of stable crosslinked nanoparticles of P(OEOMA) in the presence of DMA crosslinker. A typical procedure is as follows: OEOMA (1.4 g, 4.67 mmol), DMA (78.2 mg, 0.06 mmol), PEO2000-Br (33.4 mg, 0.016 mmol), TPMA (2.3 mg, 0.008 mmol), $CuBr_2$ (1.7 mg, 0.008 mmol), and water (1.4 mL) were mixed in a 50 mL round bottom flask at room temperature. The resulting clear solution was mixed with a solution of Span 80 (1.0 g) in cyclohexane (20 g), and the mixture was sonicated for 2 min in an ice bath at 0° C. to form a stable inverse miniemulsion. The dispersion was transferred into a 50 mL Schlenk flask, and then bubbled with argon for 30 min. The flask was immersed in an oil bath preheated to 30° C., and then an argon-purged aqueous solution of AscA (0.094 mmol/mL, 0.007 mmol, 74 μL) was added via syringe to activate the catalyst and start the polymerization. The polymerization was stopped at 2 h by exposing the reaction mixture to air, resulting in the stable dispersion of crosslinked P(OEOMA) nanogels.

To prepare OH-functionalized crosslinked P(OEOMA) nanogels, a similar procedure was applied except that an aqueous solution of 2-hydroxyethyl acrylate (HEA), 54 mg, 0.47 mmol in water (1 mL) was added after 60 min, (10 mol % of OEOMA) at ca 30% conversion during inverse miniemulsion ATRP of OEOMA (Scheme 8) and then the reaction mixture was allowed to stir at 30° C. for 12 h. The polymerization was stopped by exposing the reaction mixture to air. The resulting P(OEOMA-co-HEA) is a gradient copolymer with HEA units located mostly at the end of the gradient block copolymers since methacrylates are more reactive than the corresponding acrylates. DLS measurement shows that the average particle sizes were 225±24 nm for the homopolymeric nanogels and 236±29 nm for OH-containing nanogels, indicating an increase in the average size of OH-nanogels by 10 nm after the addition of HEA. After purification, the facile functionalization of the OH-nanogels was demonstrated by reaction with biotin (Vitamin H) using a carbodiimide coupling reaction, where the pendant OH groups on the nanogels were reacted with the carboxylic acid groups of biotins in the presence of N-(3-dimethylaminopropyl)-N'-ethylcarbodiimide hydrochloride (EDCH) in DMSO (Scheme 8).

lowing the decrease of the macromonomer peak area relative to the increase in the polymer peak area. Particle size and size distribution were measured by dynamic light scattering (DLS) on High Performance Particle Sizer, Model HP5001 from Malvern Instruments, Ltd. The sizes are expressed as $D_{av} \pm S$ (average diameter±standard deviation). The crosslinked nanogels were purified as follows: the dispersion was transferred to a centrifuge tube where the addition of THF resulted in the precipitation of the nanogels which were separated by centrifugation (15,000 rpm×20 min) and subsequent decantation of the supernatant. In this way, THF-soluble species including unreacted monomers and Span 80 (surfactant) were removed. The precipitate was then dried in a vacuum oven at 30° C. for 2 h to yield the nanogels.

Live/dead cytotoxicity assay. The dried nanogels were further purified by dialysis in water for 7 days to remove residual copper species. The resulting dispersion of nanogels was spin-coated onto glass cover slips. Residual solvents were removed under vacuum, and the polymer coated cover slips

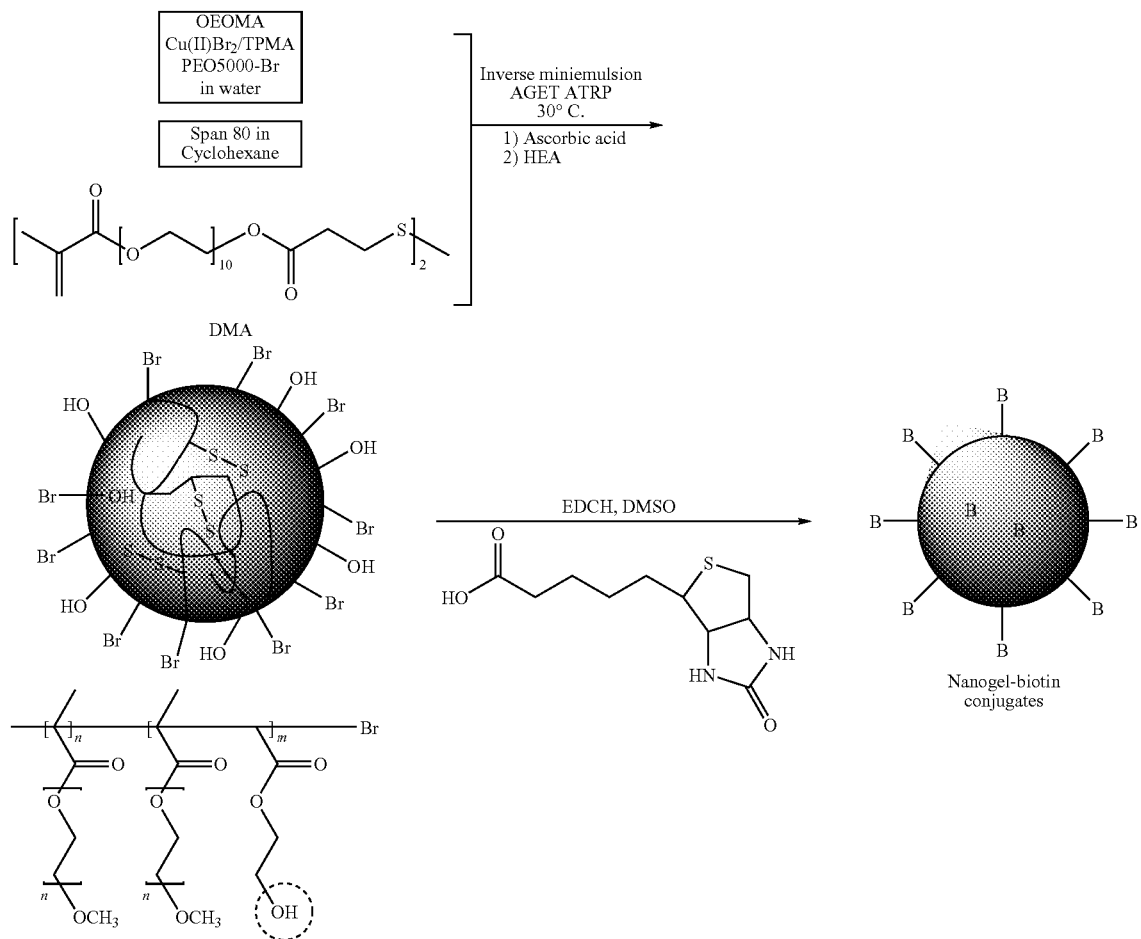

Scheme 8

Excess biotins were removed by extensive dialysis in aqueous $NaHCO_3$ solution and the biotin-functionalized nanogels were lyophilized. Molecular weights of degraded polymers were determined by gel permeation chromatography (GPC), with THF as eluent at 35° C. at a flow rate of 1 mL/min and linear poly(methyl methacrylate) (PMMA) standards for calibration. Conversion was also determined using GPC by folwere placed into the wells of 24-well culture plates and sterilized by washing with 70% ethanol for 5 min, followed by five PBS washes (for 5 min each). Control surfaces were tissue culture polystyrene. C2C12 cells were cultured in complete DMEM containing 10% fetal bovine serum and 1% penicillin-streptomycin. $5 \times 10^4$ cells suspended in 1 mL complete DMEM media were added to each well. After 24 h incubation of C2C12 cells with nanogels, DIC and fluoresce microscopy was used to visualize live and dead cells. Live cells were viewed with green fluorescence using the FITC filter, while dead cells were viewed with red fluorescence using the Rhod filter. The combined images are shown in FIG. 8. Careful counting of live/dead cells indicated over 89% viability of C2C12 cells in the presence of nanogels, compared with 95% viability of C2C12 cells in the absence of nanogels as a control experiment. These results suggest that nanogels of P(OEOMA) prepared by inverse miniemulsion ATRP are nontoxic to cells and biocompatible.

Encapsulation of R6G in nanogels. The dried nanogels (33.1 mg) were allowed to stir in water (10 mL) for 2 days to become fully swollen, and then mixed with R6G (15 mg, 0.03 mmol). The resulting reddish mixture was stirred for 3 days, and then transferred to a dialysis tubing (MW cut off=6-8 kDa) in water. Excess R6G was removed by extensive dialysis in water. The loading level of R6G into nanogels was determined to be ca. 9% (0.09 mg R6G/mg polymer). An increase in the ratio of initially added fluorescent dyes to nanogels resulted in the increased loading level of fluorescent dyes into nanogels. One can assume that the driving force was amphiphilic due to the nature of R6G and PEO, leading to their ionic and hydrophobic interactions.

R6G release from nanogels in cell media. The nanogel was spread onto the bottom of 12 wells in a 24-well tissue culture plate (with 4 wells of control). Each well contained ~0.1 mg gel. $5 \times 10^4$ C2C12 cells were plated in each well along with 1 mL of media. After 4 hours, the cells were visualized. 4 hours was required to permit cell attachment to the surface. After 24 hours, the cells were visualized again before and after adding Hoechst blue. Hoechst blue entered the cells and stained the nucleus blue. This compound was added to create some distinction between the dyes. Glutathione (6 mg) was dissolved in 2 mL media. The glutathione solution (150 μL) was added to each well. After 45 hours, the media was aspirated off, 200 μL of 1×PBS was added and the wells were imaged. The typical optical fluorescence microscopy (OFM) image of the R6G-loaded nanogels were examined and compared to the OFM image of the controlled nanogels without fluorescent dyes the distinct bright spots on the dark background indicate that dyes were localized in the nanogel particles. Upon addition of glutathione in water, the nanogels degraded into individual polymeric chains, resulting in the release of the R6G dyes and in contrast, a diffuse fluorescent signal in the background of the OFM image points out the release of dyes from the nanogels. These results demonstrate that bio-degradation of the nanogels could indeed trigger the release of encapsulated drugs in a reducing environment, through disulfide-thiol chemistry.

Next, in vitro release of R6G fluorescent dyes from R6G-loaded nanogels was demonstrated in cellular environments. The DIC and fluorescent images of C2C12 cells incubated with R6G-loaded nanogels before and after degradation in the presence of glutathione were examined. Before the addition of glutathione to a mixture of C2C12 cells incubated with R6G-loaded nanogels, red fluorescence was only localized in large R6G-loaded nanogels. None of cells were stained by free or released any R6G dye which was confirmed by comparison of the corresponding DIC images showing the location of cells. When glutathione was added, nanogels were degraded to release R6G dye, which entered and stained the cells. Furthermore, most cells in the presence of glutathione survived, since glutathione is biocompatible.

Loading of Doxorubicin into nanogels. Doxorubicin (Dox, called adriamycin or hydroxyldaunorubicin) is a DNA-interacting drug widely used in chemotherapy. Dox is water-soluble with some hydrophobic character. Dox has both amino and hydroxyl functional groups which have often been used as sites for conjugation to macromolecules, resulting in the formation of polymer prodrugs and polymer micelles useful as drug delivery carriers. The dried nanogels (35 mg) were allowed to stir in water (7 mL) for 2 days to become fully swollen, and then samples were mixed with different amounts of Dox. The resulting mixtures were stirred for 3 days, and then centrifuged to precipitate reddish Dox-loaded nanogels. The UV spectra of the supernatants were measured. Using the Beer-Lambert equation with the predetermined extinction coefficient of Dox ($\epsilon=7{,}600\ M^{-1}\ cm^{-1}$) and the absorbance at 497 nm, the amounts of Dox in the supernatants were determined, ultimately leading to the amounts of Dox loaded into nanogels.

Doxorubicin release from nanogels in cell media. Using standard cell culture techniques, $5 \times 10^4$ HeLa cells were added to each well of a 24-well plate and cultured in complete DMEM for 24 h to permit cell attachment to the surface. After this time period, Dox-loaded nanogel (16%, 1.5 mg) was added to four wells (for each nanogel sample), leaving 12 wells with no gel to serve at control. After another 24 hours (48 hours total), the media was removed from 10 of the wells (6 samples, 4 controls) and a live/dead cell assay was performed to measure the toxicity of the gel before addition of the reducing agent. After performing this analysis, glutathione (0.2 mg) dissolved in sterile PBS, was added to each well containing the nanogels and 6 of the control wells. Additionally, free Dox (1 mg) was added to 3 of the control wells. After one more day (72 hours total), the media was removed from 7 of the wells (3 samples, 4 controls) and a live/dead cell assay was performed to measure the toxicity after addition of the reducing agent and facilitated Dox release. After the cells were cultured for another 24 hours (96 hours total), the media was removed from 7 of the wells (3 samples, 4 controls) and a live/dead cell assay was performed to measure the toxicity after addition of the reducing agent and facilitated Dox release. Table 2 presents the detailed results.

TABLE 2

Loading level and efficiency of Dox into nanogels

| Dox/Nanogels (wt ratio) | Loading Level (wt %) | Loading efficiency (wt %) |
|---|---|---|
| 0.07/1 | 5.4 | 70 |
| 0.35/1 | 16.4 | 51 |

The loading level of Dox into nanogels (amount of Dox in nanogels) increased from 5.4 wt % to 16.4 wt % when the initial ratio of Dox/nanogel in mixture increased from 0.07/1 to 0.35/1. The loading efficiency (amount of Dox loaded in nanogels versus added to mixture) was as high as 50-70%; however the efficiency decreased as the amount of Dox added to mixtures increased. This type of increase in adsorption may be due to an increase in the extent of both hydrophobic and hydrophilic interactions between Dox and OEG segments, because they have dual characteristics.

To confirm the non-limiting exemplary concept that Dox-loaded nanogels will be degraded upon the addition of glutathione in cellular media and in turn, the released Dox molecules will kill cancer cells, HeLa cancer cells were incubated with and without 16.4% Dox-loaded nanogels. The cell viability was measured at the 48-hour time point using live/dead staining to estimate the cytotoxicity of the Dox-loaded nanogel before addition of the reducing agent. After performing this analysis, glutathione was added to the wells containing the nanogels and free Dox was added to some control wells without nanogels. The resulting mixtures were maintained for another 48 h. FIG. 9 shows the results of cell viability. Before addition of glutathione and free Dox, it was interesting to observe that the viability of HeLa cells in the presence of Dox-loaded nanogels was similar to the control. This suggests that most Dox remained in the nanogels with no significant non-specific leaching of Dox from the nanogels. This minimization of non-specific release of drugs during circulation in the blood will be a significant factor for the in vivo application of the nanogels as drug delivery carriers. Upon the addition of glutathione, the nanogels were degraded and released Dox to kill HeLa cells. From an analysis based on live/dead cytotoxicity assays after Dox release, the cell viability was ca. 52% in the presence of Dox-loaded nanogels, which is lower than that for the control (93%) but around 7 times higher than that (7%) in the presence of free Dox. However, the level of viability is similar in both cases, since the amount of free Dox added was 6-7 times larger than that in Dox-loaded nanogels. This experiment demonstrates that the Dox-loaded nanogels are essentially nontoxic before addition of the reducing agent (48-hour mark in the graph), but after the reducing agent is added, the drug is released, and the cell growth is significantly inhibited due to the presence of released Dox (96 h mark).

Synthesis of biotin-functionalized nanogels. An aliquot of the purified OH-functionalized nanogels (0.3 g, 0.1 mmol HEA units assumed with 100% conversion) was mixed with dicyclohexyl carbodiimide (24.7 mg, 0.12 mmol) in DMF (5 mL). Biotin (29.3 mg, 0.12 mmol) was added to the reaction mixture at 0° C. in an ice bath, and then the resulting mixture was stirred at room temperature for 12 h. The products of biotin-conjugated nanogels were purified as follows: The reaction mixture was transferred to dialysis tubing and excess biotin was removed by extensive dialysis in aqueous solution of $NaHCO_3$ for 5 days. The biotin-nanogels were then lyophilized and further dried in a vacuum oven at 30° C. for 12 h.

The bioavailablity of biotin present in the OH-functionalized nanogels to its protein receptor was evaluated by the avidin/HABA binding assay and optical fluorescent microscopy (OFM). The avidin/HABA assay allows determining the amount of biotin in the functionalized nanogels. FIG. 10 shows the UV-vis spectra of avidin-HABA complex before and after addition of biotin-functionalized nanogels. Upon the addition of biotin-functionalized nanogels, absorbance at 500 nm sharply decreased from 0.79 to 0.27, indicating that the biotin molecules in the nanogels competitively bind to avidin, by replacing HABA molecules. Using the calibration plot of free biotin in water, reported by Wooley and coworkers, [Qi, K.; Ma, Q.; Remsen, E. E.; Clark, C. G., Jr.; Wooley, K. L. *J. Am. Chem. Soc.* 2004, 126, 6599] the difference of absorbance allows determination of the amount of biotin in nanogels to be 16.7 nmol/mg polymer, which corresponds to 142,000 biotin molecules available in each nanogel particle, based on the size of nanogels in water, 310 nm in diameter.

The bioavailability of biotins in nanogels was further demonstrated by mixing the biotin-functionalized nanogels with FITC-avidin in PBS buffer. The formation of aggregates of avidin-biotin-nanogels was observed by optical fluorescence microscopy. As shown in FIG. 15, the distinct bright spots on the dark background indicate the formation of complex of biotin-nanogels with FITC-labeled avidin. The large fluorescent spots may indicate the formation of large aggregates since each avidin has four binding pockets to biotin. Such formation of aggregates of avidin and biotin-functionalized polymers was also found in literature.

FIG. 11 shows the extent of degradation (weight faction of remaining nanogels) in the presence of different amounts of glutathione expressed as the wt ratio of glutathione/nanogels. In the absence of glutathione, the weight fraction of nanogels was almost 100%, indicating no significant degradation. However, in the presence of glutathione, the weight fraction of nanogels was decreased as a function of time, indicating the occurrence of degradation. The degradation rate of nanogels increased with the amount of glutathione. For example, in the presence of ca. 20 wt % of glutathione, over 85% nanogels were degraded within 1 h. The GPC measurements of the clear supernatant were further used to analyze polymers degraded from nanogels in the presence of glutathione. The GPC trace indicate that degraded polymers had $M_n$=43,000 and $M_w/M_n$=1.6. Note the targeted DP at 100% conversion was 290 and if a final DP of less than 15,000 was desired either more initiator could be added or a degradable linkage could be incorporated into the backbone in an ATRP/ring opening copolymerization. See for example, PCT/US04/09905

For comparison, nanogels prepared by free-radical polymerization (FRP) in inverse miniemulsion under similar conditions were also examined for biodegradation in the presence of glutathione. However, these gels did not degrade to any significant degree.

Discussion of example 9. (Bio)degradable, crosslinked P(OEOMA) nanoparticles were prepared using an AGET ATRP of OEOMA in inverse miniemulsion in the presence of a disulfide-functionalized dimethacrylate (DMA) crosslinker at ambient temperature (30° C.). In the absence of DMA, well-controlled P(OEOMA) with narrow molecular weight distribution ($M_w/M_n$<1.3) was prepared in uncrosslinked colloidal particles of 151±8 nm in diameter with narrow, monodisperse size distribution. In the presence of DMA, expressed as $[DMA]_0/[I]_0$=4/1, the resulting particles were not soluble in any solvents, including THF and water, indicating that the particles were crosslinked during the polymerization. The diameter of particles dispersed in cyclohexane was 225±24 nm.

In this non-limiting example, stable biodegradable nanogels crosslinked solely with disulfide linkages were prepared by utilizing inverse miniemulsion atom transfer radical polymerization (ATRP). These nanogels possess useful features as targeted drug delivery scaffolds for biomedical applications. They have uniformly crosslinked network which can improve control over the release of encapsulated agents. They were biodegraded into water-soluble polymers in the presence of a biocompatible glutathione tripeptide which is commonly found within cells. The biodegradation of nanogels can trigger the release of encapsulated molecules exemplified herein by rhodamine 6G, a fluorescent dye, and Doxorubicin (Dox), an anticancer drug, in vitro as well as facilitate the removal of empty vehicles. Results obtained from optical fluorescence microscope images and live/dead cytotoxicity assays of HeLa cancer cells suggested that the released Dox molecules could penetrate cell membranes to suppress the growth of cancer cells. The introduction of 2-hydroxyethyl acrylate (HEA) into polymerization resulted in the formation of OH-functionalized nanogels. A facile applicability of these nanogels toward bioconjugation was demonstrated by reacting with biotin using a carbodiimide coupling reaction in water. The bioavailability of biotin in nanogels was determined to be 142,000 biotin molecules in each nanogel particle and the formation of bioconjugates of nanogels with avidin was confirmed using optical fluorescence microscopy.

Example 10

Peptide Functionalized Nanogels

Synthesis of Well Controlled HO-POEOMA by Cyclohexane Inverse Miniemulsion AGET ATRP A series of AGET ATRcoP, using OEOMA300 and OEOMA475, was conducted for the synthesis of colloidal particles of well controlled POEOMA in inverse miniemulsion of cyclohexane under different conditions.

A typical procedure for the synthesis of POEOMA300 is described below. OEOMA300 (1.4 g, 4.67 mmol), HO-EBiB (29.0 mg, 0.094 mmol), TPMA (13.6 mg, 0.047 mmol), $CuBr_2$ (10.4 mg, 0.047 mmol), and water (1.4 mL) were mixed in a 50 mL round bottom flask at room temperature. The resulting clear solution was mixed with a solution of Span 80 (1.0 g) in cyclohexane (20 g), and the mixture was sonicated for 2 min in an ice bath at 0° C. to form a stable inverse miniemulsion. The dispersion was transferred into a 50 mL Schlenk flask, and then bubbled with argon for 30 min. The flask was immersed in an oil bath preheated to 30° C., and then an argon-purged aqueous solution of AscA (0.094 mmol/mL, 0.037 mmol, 400 μL) was added via syringe to activate the catalyst and start the polymerization. Samples were withdrawn periodically from the reaction to determine conversion and molar mass by GPC. The polymerization was stopped by exposing the reaction mixture to air. The targeted degree of polymerization (DP) was varied between 50 and 150. As presented in the following table, conversion reached ca. 65% in 90 min for both polymerizations. The molecular weight distribution is also monomodal and low, $M_w/M_n<1.3$.

TABLE 3

Experimental Conditions, Conversion, and Molecular Weight Data for AGET ATRP of OEOMA300 in Inverse Miniemulsion at 30° C.

| Entry | OEOMA300/ HO-EBiB/$CuBr_2$-TPMA/AscA[a] | Time/ min | Conv. | $M_{n,theo}$ | $M_{n,GPC}$ | $M_w/M_n$ |
|---|---|---|---|---|---|---|
| A | 150/1/0.5/0.45 | 90 | 0.63 | 28,200 | 25,000 | 1.28 |
| B | 50/1/0.5/0.40 | 90 | 0.65 | 10,000 | 14,000 | 1.22 |

[a]OEOMA300/water = 1/1 v/v; solids content = 10 wt %.

In a similar way, colloidal particles of well controlled HO-POEOMA475 were also synthesized except that OEOMA475 (1.4 g, 2.95 mmol), HO-EBiB (3.1 mg, 0.01 mmol), TPMA (1.5 mg, 0.005 mmol), $CuBr_2$ (1.1 mg, 0.005 mmol), water (1.4 mL), Span 80 (1.0 g), cyclohexane (20 g), and an argon-purged aqueous AscA solution (0.056 mmol/mL, 0.004 mmol, 78 μL) was used. $[OEOMA475]_0/[HO-EBiB]_0/[CuBr_2/TPMA]_0/[AscA]_0=300/1/0.5/0.38$. The polymerization showed a 5 min induction period then the reaction followed first-order kinetics, reaching 80% conversion within 60 min. The occurrence of induction period may be attributed to the slow reduction of the Cu(II) complex to the active Cu(I) complex, as well as their high hydrophilicity. The molecular weight increased with conversion and molecular weight distribution was low, $M_w/M_n<1.2$.

These results indicate that inverse miniemulsion ATRP of both OEOMA300 and OEOMA475 in the presence of HO-EBiB resulted in the formation of well controlled HO-POEOMA with various DPs.

Synthesis of amine-terminated GRGDS. The oligopeptide sequence GRGDS was synthesized according to standard Fmoc solid phase peptide synthesis using the batch-wise process and the peptide coupling agent HBTU. Fmoc-Ser(But)-loaded Wang resin (3.12 g with loading density of 0.6 mmol/g) was weighed into an oven-dried glass-fritted reaction tube and swollen with 30 mL dry $CH_2Cl_2$ for 5-10 min. The Fmoc group was cleaved by the addition of a 25/75 solution of piperidine/DMF (30 mL), followed by agitation with $N_2(g)$ for 5 min. The resin was filtered, and fresh piperidine/DMF (30 mL) was added. After agitating for 20 min, the resin was filtered and washed with DMF 6 times. A solution of Fmoc-Asp(OBut)-OH (3.85 g, 9.35 mmol), DIC (1.45 mL, 9.35 mmol), HBTU (3.48 g, 9.17 mmol), and HOBt (1.26 g, 9.35 mmol) in 20 mL of anhydrous DMF was prepared. After the solution became homogeneous, DIPEA (3.28 mL, 18.70 mmol) was added, and the resulting mixture was added immediately to the resin. The resin was then agitated for 2 hr, filtered, and washed with DMF (3 times). A 25/75 solution of piperidine/DMF (30 mL) was added, and the resin agitated for 5 min. After filtration, piperidine/DMF was again added to the resin followed by agitation for 20 min. The resin was then washed with DMF (6 times). The above amino acid addition procedure was repeated for Fmoc-Gly-OH, Fmoc-Arg(Pbf)-OH, and a second unit of Fmoc-Gly-OH. The peptide was then deprotected and cleaved from the resin by agitating with a 88/2/5/5 solution of $TFA/TIPS/H_2O/phenol$ (30 mL) for 2 hr. The solution was filtered, and the cleavage procedure was repeated with 30 mL of fresh solution and 30 min agitation. The resin was then washed with $CH_2Cl_2$ (3 times), and the filtrated was concentrated by rotary evaporation, precipitated into cold ether and stored at 4° C. for several hours before filtration. The solid was isolated by filtration, rinsed with diethyl ether (3 times), and dried under vacuum overnight to afford a white powder in nearly quantitative yield (based upon the given resin-loading density). The peptide was further purified by dialysis, dried by freeze-drying, and characterized by MALDI-TOF MS, showing two main peaks at 492.01 g/mol and 513.89 g/mol (cationized with $H^+$ and $Na^+$, respectively). A third peak at 439.66 g.$mol^{-1}$ was the product from the peptide fragmentation during the MALDI process ($RGDS/Na^+$).

Synthesis of Biotin-conjugated POEOMA. A clear solution containing the purified HO-POEOMA (M=22,000 g/mol, 0.76 g, 0.034 mmol), biotin (13.0 mg, 0.052 mmol), DCC (10.7 mg, 0.052 mmol), a catalytic amount of DMAP, and DMF (3 mL) was stirred at room temperate. After 1 day, aqueous $NaHCO_3$ solution was added to form water-soluble sodium salts of biotin. The product was extracted with $CH_2Cl_2$, isolated by evaporation of solvents, and further dried in vacuum oven at 35° C. for 12 h.

Avidin/HABA binding assay. A HABA stock solution consisting of HABA (11.7 mg) and PBS (7 mL) was prepared. In turn, an avidin-HABA stock solution was prepared by mixing an aliquot of the HABA stock solution (0.5 mL), avidin (1.4 mg), and PBS (7.5 mL). An aliquot of the avidin-HABA stock solution (2.8 mL) was then mixed with biotin-conjugated POEOMA (2.2 mg) and the resulting mixture was stirred for 12 h. The UV-vis spectra of the solution before and after the addition of biotin-POEOMA were measured.

The reaction mixture was diluted with aqueous $NaHCO_3$ solution, resulting in the formation of water-soluble salts of excess biotins. The product, Biotin-POEOMA, was then extracted with $CH_2Cl_2$. The extent of functionalization of HO-POEOMA with biotin was calculated by the avidin/HABA binding assay. Upon the addition of Biotin-POEOMA to the avidin-HABA complex solution, absorbance at 500 nm sharply decreased from 0.52 to 0.21, indicating that the biotin molecules in the polymers competitively bind to avidin, by replacing HABA molecules.

Synthesis of COOH-functionalized POEOMA (HOOC-POEOMA). A clear solution containing the purified HO-POEOMA (M=25,700 g/mol, 0.284 g, 0.011 mmol), succinic anhydride (2.6 mg, 0.026 mmol), Et$_3$N (0.5 mL), and DMF (3 mL) was stirred at room temperate for 1 day. The mixture was poured into 10 wt % aq. HCl solution and then stirred for 2 h at room temperature. The product was extracted with CH$_2$Cl$_2$, isolated by evaporation of solvents, and then dried in a vacuum oven at 30° C. for 12 h.

Synthesis of pyrene-functionalized POEOMA (Py-POEOMA). A dispersion containing the purified HOOC-POEOMA (M=25,700 g/mol, 0.12 g, 0.011 mmol), N-hydroxysuccinic anhydride (51.5 mg, 0.45 mmol), EDCH (0.5 mg, 0.002 mmol), py-NH$_2$ (65.9 mg), and water (3 mL) was stirred at room. After 2 days, aqueous KOH solution was added to the reaction and the undissolved solids were removed by vacuum filtration. The product was extracted with CH$_2$Cl$_2$, isolated by evaporation of solvents, and then dried in a vacuum oven at 30° C. for 12 h.

Synthesis of COOH-functionalized POEOMA nanogels (HOOC-POEOMA nanogels). 0.0117 g dried POEOMA nanogels (0.000344 mmol) was mixed with 0.0344 g succinic anhydride (0.344 mmol) in 0.5 mL DMF with 1 drop of triethylamine. The mixture was stirred at room temperate for 2 days. The modified nanogels were dried, suspended in water, and dialyzed against water for 2 days in a membrane with a pore size of 13,000 Da, changing the water 5 times. After dialysis, the product was dried to yield 0.0117 g (~100%).

Synthesis of GRGDS-functionalized POEOMA nanogels (GRGDS-POEOMA nanogels). 0.01 g dried HOOC-POEOMA nanogels (0.000294 mmol) were mixed with 0.0073 g GRGDS-NH$_2$ (0.0147 mmol), 0.0037 g DIC (0.0294 mmol), 0.00397 g HOBT (0.0294 mmol) and 0.8 µL triethylamine in 0.5 mL of DMF. The mixture was stirred at room temperate for 2 days. The modified nanogels were dried, suspended in water, and dialyzed against water for 2 days in a membrane with a pore size of 13,000 Da, changing the water 5 times. After dialysis, the product was dried and analyzed by $^1$H NMR.

AGET ATRP of OEOMA300 was conducted in the presence of HO-EBiB and a PEO DMA cross-linker in cyclohexane inverse miniemulsion to prepare well controlled HO-functionalized cross-linked POEOMA nanogels. The conditions used were: [OEOMA300]$_0$/[HO-EBiB]$_0$/[CuBr$_2$]$_0$/[TPMA]$_0$/[PEO DMA]$_0$/[AscA]$_0$=1500/1/0.5/0.5/4/0.45. The polymerization was stopped after 5 hours, diluted with THF, and centrifuged at 13,000 rpm for 30 minutes to precipitate the nanogels. The isolated nanogels were purified by dialyzing against water for 5 days.

Example 11

Synthesis of Doubly-Crosslinked Water Swellable Nanogels

A water soluble stable dimethacrylate crosslinker (DMA4600-CC) was synthesized using a carbodiimide coupling reaction of PEG with M=4,600 g/mol with methacrylic acid (MAA) in the presence of DCC and DMAP in methylene chloride. A solution containing PEG (6.8 g, 1.47 mmol), DCC (0.6 g, 3.56 mmol), and a catalytic amount of DMAP was added MAA (0.28 g, 3.56 mmol) in an ice bath at 0° C. The resulting mixture was allowed to stir at room temperature overnight. The formed solids were removed by vacuum filtration and solvents were removed. The solids were dissolved in water and undissolved solids were removed, and then products were extracted from methylene chloride, isolated from evaporation, and dried in vacuum oven.

A series of doubly-crosslinked nanogels were prepared by inverse miniemulsion ATRP. First, a nanogel sample with [DMA-SS]$_0$/[DMA-CC]$_0$/[I]$_0$=4/4/1 was prepared. Table 4-1 compares their sizes in different solvents with those prepared in the absence of degradable crosslinker, that is, with [DMA]$_0$/[I]$_0$=4/1. The size of particles dispersed in cyclohexane was 205 nm in the presence of DMA-SS, which is larger than that (157 nm) in its absence. This difference will be caused due to the presence of some impurities in DMA-SS crosslinker. After purification by precipitation into a mixture of CH and THF, followed by redispersion in solvents (THF and water), the size is larger in the presence of DMA-SS than its absence, since the former is more crosslinked. All particles show the monomodal size distributions. In addition, swollen particles in water and in THF are similar.

TABLE 4-1

| DMA-SS | CH | THF | Water |
|---|---|---|---|
| Presence | 205 nm | 242 nm | 233 nm |
| Absence | 157 nm | 285 nm | |

Another nanogel sample with [DMA-SS]$_0$/[DMA-CC]$_0$/[I]$_0$=4/2/1 was prepared. Table 4-2 compares their sizes in the presence and absence of degradable crosslinker.

TABLE 4-2

| DMA-SS | CH | THF | Water |
|---|---|---|---|
| Presence | 216 nm (0.07) | 473 nm (0.10) | 447 nm (0.31) |
| Absence | 162 nm (0.10) | multimodal (FIG. 1) | |

Degradation-oxidation experiments were conducted for the sample prepared with [DMA-SS]$_0$/[DMA-CC]$_0$/[I]$_0$=4/4/1. The swollen particles in THF were subjected to chemical degradation in the presence of Bu$_3$P. After stirring the mixture for 2 days, the size was 306 nm in diameter with monomodal distribution. A ~60 nm increase in gel particle size after degradation.

These results indicate that well-defined functional nanogels hold great potential as carriers for controlled drug delivery scaffolds to target specific cells. In short, the nanogels can be readily conjugated with biomolecules such as proteins and antibodies that can recognize receptors on living cells and can enter cells through receptor-medicate endocytosis. The nanogel-bioconjugates will then be degraded gradually in the presence of glutathione inside cells and the degradation can trigger controllable release of encapsulated molecules such as drugs to kill targeted disease cells, exemplified by cancer cells.

This invention, therefore, is concerned with preparation and use of functional gel microparticles as polymer drug conjugates. The gel particles can comprise any size between than 5 µm and 10 mm and can be prepared by ATRP, or other CRP processes, in miniemulsion or reverse miniemulsion polymerization systems or other biphasic systems, from microemulsion to suspension, where (co)monomers are copolymerized with divinyl permanent crosslinkers and divinyl degradable crosslinkers. The ratio of targeted degree of polymerization (DP) to crosslinking agents provides control over the "mesh size" of the formed gel. Addition of AB* monomers can also modify the mesh size by incorporation of three arm branch points into the network. The larger particles can be prepared by suspension polymerization processes if desired.

Image enhancement. An intermediate objective, between using functional nano-gel particles for cancer identification and cancer treatment, is a desire to enhance the image of the cancer site to allow for improved diagnosis. Gold nanoparticles with a diameter of 2-3 nm were trapped inside of POEOMA nanogels as a way to increase the electron density, and thus the TEM visibility, of the nanogels. This allowed for improved visualization and contrast in TEM. Briefly, a sample of dried permanently cross-linked POEOMA nanogels was stirred with a suspension of gold nanoparticles in water. After 3 days, the contents were dialyzed against water to allow any free gold particles to diffuse out of the membrane tubing. Individual gold nanoparticles alone, nanogels alone, and gold nanoparticle loaded nanogels were imaged by TEM. All visible gold nanoparticles were encased inside of POEOMA nanogels. No free gold particles are observed outside of the aggregated particles. The electron density is much greater (the halos around the gold particles are darker, especially compared to the images of the gold alone). This is evidence of the presence of the POEOMA nanogels with entrapped gold. The gold particles are 2-3 nanometers, the same size as the gold alone sample.

After culturing with MC3T3 cells, the gold nanoparticle loaded nanogels were imaged along the cell membranes after 1 hour. At this time point, no gold nanoparticle loaded nanogels were observed inside of the cells. After 4 hours, and at the later time points (8 hours and 24 hours), aggregates of gold nanoparticle loaded nanogels were imaged inside of cells.

In one embodiment of the invention the formed particles comprise a fraction of crosslinks that are degradable in a reducing environment and in a further embodiment of the process, a fraction of crosslinks that are slowly degradable in a biological environment to individual polymeric chains with relatively narrow molecular weight distribution ($M_w/M_n$<1.5). In one embodiment, the gels are preferentially prepared using a controlled "living" polymerization process in either bulk, solution, suspension polymerization processes and gel particles are formed during a post polymerization step as known in the art or where additional control over the gel particle size is desired the gel particles can preferentially be prepared by conducting a controlled or living copolymerization in biphasic media where the dispersed phase comprises the gel precursor.

In one embodiment of the invention water swellable nanogels are prepared in one step in an inverse miniemulsion polymerization process and these water compatible nanoparticles provide enhanced circulation time of the loaded nanogels in the blood.

In another embodiment of the process a hydrophobic gel particle is prepared in a miniemulsion polymerization process providing particles that can be loaded with hydrophobic drugs.

In another embodiment the first hydrophobic particles can further comprise a water swellable or water compatible shell to enhance circulation time of the loaded nanogels in the blood.

In one embodiment of the invention two or more different degradable crosslinkers are incorporated into either the hydrophylic gel particle or the hydrophobic gel particle to control the rate of "opening" of the gel in the target environment. In this embodiment control over the rate of opening of the gel provides control over the rate of release of the encapsulated material in the targeted environment.

In one embodiment of the invention the functional compound that is desired to be encapsulated within the gel can be added during the gel formation process.

In another embodiment the agent can be added at a later time and the agent can diffuse into the gel based on the preferred environment within the gel or can be added in a separate step wherein the agent can be added to an "open" gel and then the gel can be "closed" thereby encapsulating the agent. In this embodiment the gel network is opened and swelling ratio is increased as the reversible crosslinks are cleaved then closed, as they are reformed encapsulating the added agents.

In a further embodiment of the process a shell is formed on the particle to seal the encapsulated materials within the particle.

Embodiments of the invention exemplified above include the preparation of functional crosslinked gels particles wherein the gels comprise a network of permanent, or more chemically stable, crosslinks or branch points as the support (or substrate) and with an additional fraction of reversibly cleavable crosslinks or branch points that interact to allow the dual functional crosslinked responsive network to encapsulate and retain an increased volume fraction of target molecules within the gel.

In a further embodiment the functional gel material comprising a responsive crosslink network and a more stable crosslink network. The structure of the gel is selected to allow enhanced encapsulation of active materials within the functional gel and attachment of bio-responsive agents to the exterior of the nanogels. The bio-responsive gel additionally allows delivery of the gel to a specific targeted environment within the body, and release of one or more encapsulated materials at the targeted site by degradation of some or all of the crosslinks in the gel.

This is exemplified in one embodiment by preparation of microparticles further comprising crosslinks that degrade in a reducing environment such as that present in cancer cells or cancerous tumors. The gel acts as a biocompatible drug carrier which should not cause any reaction to the immune system. The molecular fragments of the gel particle formed after complete degradation can be designed to comprise a molecular weight lower than the renal threshold. The drug is controllably released (i.e., if the drug or agent selected for targeted delivery is attached to the polymer via chemical bonds, they should degrade, preferably selectively, in the targeted tissue), and the carrier should be easy to functionalize with targeting molecules via links that do not prematurely degrade in the body.

In one embodiment of the invention, the reversibly degradable crosslinks comprise a disulfide bond as disclosed in patent application PCT/US04/09905. If such a disulfide bond is incorporated into a crosslinking agent present, either as the sole reversible crosslinking agent, or as one of two or more reversible crosslinking agents, then the disulfide group can be used to bind additional added molecules to the gel particle.

In a further embodiment of the process, the capacity of the first formed gel comprising a functional crosslink network to entrap/interact with additional molecules can be further enhanced by employing the terminal functionality that was initially present on each added initiator molecule and is now present within the gel particle to form a core shell structure by addition and polymerization of a second set of (co)monomer(s). Therefore, in this manner the surface properties of microgels can be easily tuned by chain extension from the chain-end functionalities remaining within in the microgels. This can form a shell to enrich the concentration of either hydrophobic guest molecules in a gel prepared by bi-phasic aqueous polymerization processes or hydrophilic guest molecules in gels prepared by inverse emulsion processes. This embodiment can also be employed to further seal the agents within the gel particle.

In a further embodiment of the process, a monomer comprising a functional group can be copolymerized with the first monomer to provide functional groups along the backbone that are employed to attach either directly or indirectly a bio-responsive agent.

In a further embodiment, the fragments first released from the gel when it reaches the targeted site comprises and additional agent that is preferentially cleaved from the gel to indicate successful targeting has occurred.

In the various embodiments of the processes for gel formation described herein, small initiators and low molecular weight monomers have been used with unexpected success. High molecular weight macroinitiators and/or macromonomers (or graft chains) may instead be added to the feed stock for forming the gel particles. However, the use of such high molecular weight monomers or initiators would change the topology and responsiveness of the gel particle.

We claim:

1. A gel particle comprising a polymeric network comprising:
   vinyl monomeric units;
   at least one first divinyl monomeric unit, wherein the vinyl groups are connected by a chemically stable linking group which comprises a functionality that degrades in a predetermined chemical or predetermined biological environment over a time period of 7 days to 30 days; and
   at least one second divinyl monomeric unit, wherein the vinyl groups are connected by a cleavable linking group,
   wherein the polymeric network is formed by a controlled polymerization process and wherein the first divinyl monomeric unit forms chemically stable crosslinks within the polymeric network and the second divinyl monomeric unit forms cleavable crosslinks within the polymeric network: and
   wherein the gel particle has a diameter of from 5 nm to 500 nm.

2. The gel particle of claim 1, wherein at least a portion of the cleavable crosslinks are cleavable in a predetermined chemical or predetermined biological environment.

3. The gel particle of claim 1, wherein the cleavable crosslinks are reversibly cleavable crosslinks.

4. The gel particle of claim 1, wherein the cleavable crosslinks comprise one or more cleavable functionality selected from the group consisting of an anhydride, an oligo(lactate) ester, a disulfide, a hydrazine, a hydrazone, an acetal, an oxime, an imine, a Schiff base, a urethane, a degradable oligo/polymer segment, and combinations thereof.

5. The gel particle of claim 4, wherein the cleavable crosslinks comprise a degradable oligo/polymeric segment selected from the group consisting of a polysaccharide, a polyester, a peptide, a protein, a chitin and a chitosan.

6. The gel particle of claim 4, wherein the cleavable crosslinks comprise two or more cleavable functionalities, wherein the two or more cleavable functionalities have different rates of cleavage in different chemical or biological environments.

7. The gel particle of claim 1, wherein the polymeric network comprises one or more polymer segments having a controlled topology, wherein the one or more polymeric segments comprise vinyl monomeric units selected from the group consisting of hydrophilic monomeric units, hydrophobic monomeric units, and combinations thereof.

8. The gel particle of claim 1, wherein the polymeric network degrades during the time period to polymer fragments having a size below the renal threshold.

9. The gel particle of claim 1, further comprising one or more quest compounds, wherein the guest compound or quest compounds are chemically or physically encapsulated within the gel particle.

10. The gel particle of claim 9, wherein the guest compound is selected from the group consisting of a nano-size star macromolecule, a fluorescent molecule, a color pigment, an inorganic nanoparticle, a nanoparticle with a fluorescent core, a biologically active compound, a drug, a cancer drug, a nanocomposite structure, a biospecific molecule, and combinations of any thereof.

11. The gel particle of claim 9, wherein the polymeric network comprises one or more polymeric backbone segments and wherein the encapsulated compound is retained within the gel particle by at least one interaction with one or more polymeric backbone segments in the gel particle, wherein the at least one interaction is selected from the group consisting of chemical affinity, hydrogen bonding, Van der Waal's interactions, ionic interactions, hydrophilic interactions, hydrophobic interactions, chemical reactions, and combinations thereof.

12. The gel particle of claim 9, wherein cleavable crosslinks are cleaved to give at least one reactive functional group and wherein the at least one reactive functional group forms at least one chemical bond with the encapsulated compound.

13. The gel particle of claim 9, wherein the guest compound or compounds are active compounds, and are located in the interior portion of the gel particle.

14. The gel particle of claim 1, further comprising a residue of an initiator, wherein the ratio of the first divinyl monomeric unit to the initiator is greater than 1:1.01.

15. The gel particle of claim 1, further comprising a delivery notification system or an imaging system, wherein the delivery notification system or the imaging system comprise at least one of an imaging agent, magnetic particles, and luminescent compound.

16. The gel particle of claim 1, further comprising at least one functional agent or a residue of at least one functional agent on at least a portion of an outer surface of the gel particle.

17. The gel particle of claim 16, wherein the residue or at least one functional agent forms a chemical bond with a surface reactive agent.

18. The gel particle of claim 17, wherein the surface reactive agent is selected from the group consisting of reactive monomers, reactive macromonomers, reactive oligomers, and combinations thereof, and
   the gel particle further comprises a polymeric shell bonded to at least a portion of the surface of the gel particle, wherein the polymeric shell is formed by reaction of the surface reactive agent,
   wherein the polymeric shell has a phobicity different than the phobicity of the surface of the gel particle.

19. The gel particle of claim 18, wherein the polymeric shell seals one or more pores on the surface of the gel particle and further encapsulates a chemically or physically encapsulated compound; and
   wherein the polymeric shell is bonded to the surface of the gel particle by one of degradable bonds and stable bonds.

20. The gel particle of claim 17, wherein the surface reactive agent is a functional macromolecule comprising a bioresponsive molecule, wherein the bioresponsive molecule enhances surface properties of the surface of the gel particle to allow transportation of the gel particle to specific target environments.

21. The gel particle of claim 1, wherein the gel particle is a nanogel, a microgel, a macrogel, or a bead.

22. A process for preparing a gel particle comprising:
polymerizing by a controlled polymerization process in a biphasic medium a composition comprising:
vinyl monomeric units;
at least one first divinyl monomeric unit, wherein the vinyl groups are connected by a chemically stable linking group which comprises a functionality that degrades in a predetermined chemical or predetermined biological environment over a time period of 7 days to 30 days; and
at least one second divinyl monomeric unit, wherein the vinyl groups are connected by a cleavable linking group; and
forming a polymeric network comprising chemically stable crosslinks and cleavable crosslinks; wherein the gel panicle has a diameter of from 5 nm to 500 nm.

23. The process of claim 22, further comprising:
encapsulating a functional compound within the gel particle during the polymerization process, and
wherein the functional compound is selected from the group consisting of a nano-size star macromolecule, a fluorescent molecule, a color pigment, an inorganic nanoparticle, a nanoparticle with a fluorescent core, a biologically active compound, a drug, a cancer drug, a nanocomposite structure, a biospecific molecule, and combinations thereof.

24. The process of claim 22, wherein the cleavable crosslinks are reversibly cleavable crosslinks, and
wherein the process further comprises:
cleaving at least a portion of the reversibly cleavable crosslinks to increase the swelling ratio of the gel particle;
adding a compound, wherein the compound migrates into an interior portion of the swelled gel particle; and
reforming the reversibly cleavable crosslinks to decrease the swelling ration of the gel to encapsulate the compound.

25. The process of claim 22, further comprising:
attaching one or more surface reactive agents to at least a portion of an outer surface of the gel particle, wherein the surface reactive agent forms a chemical bond with a functional agent on at least a portion of the outer surface of the gel particle.

26. The process of claim 22, wherein the biphasic medium comprises one of a continuous aqueous phase and a continuous non-aqueous phase, wherein the continuous non-aqueous phase is selected from the group consisting of an organic phase, an ionic liquid, and a supercritical fluid, and
wherein the biphasic polymerizing comprises a microemulsion polymerizing process, a miniemulsion polymerizing process, an emulsion polymerizing process, or a suspension polymerizing process.

27. A process for delivering one or more compounds to a target site comprising:
delivering the gel particle of claim 13 to a target site;
cleaving at least a portion of the cleavable crosslinks of the polymeric network; and
increasing a swelling ratio of the gel particle such that the quest compound or compounds are released from the interior portion of the gel particle.

28. The process of claim 27, further comprising:
degrading at least a portion of the chemically stable crosslinks to form polymer fragments having a size below the renal threshold.

29. The process of claim 27, further comprising:
attaching at least one surface reactive agent to at least a portion of a surface of the gel particle, wherein the surface reactive agent alters at least one surface property of the gel particle.

* * * * *